(12) United States Patent
Hayashi et al.

(10) Patent No.: US 7,667,918 B2
(45) Date of Patent: Feb. 23, 2010

(54) DISK ARRAY DEVICE

(75) Inventors: Katsunori Hayashi, Odawara (JP);
Hiroshi Suzuki, Sagamihara (JP);
Tomokazu Yokoyama, Fujisawa (JP);
Toshiyuki Nagamori, Odawara (JP)

(73) Assignee: Hitachi, Ltd., Tokyo (JP)

( * ) Notice: Subject to any disclaimer, the term of this patent is extended or adjusted under 35 U.S.C. 154(b) by 858 days.

(21) Appl. No.: 11/198,192

(22) Filed: Aug. 8, 2005

(65) Prior Publication Data

US 2006/0250724 A1    Nov. 9, 2006

(30) Foreign Application Priority Data

May 9, 2005    (JP) .............................. 2005-136328

(51) Int. Cl.
*G11B 19/02*    (2006.01)
(52) U.S. Cl. .............................. 360/69; 360/31; 360/39; 360/46; 363/89
(58) Field of Classification Search ........................ None
See application file for complete search history.

(56) References Cited

U.S. PATENT DOCUMENTS

| | | | |
|---|---|---|---|
| 5,765,117 A * | 6/1998 | Horiguchi ..................... 701/51 |
| 6,483,730 B2 * | 11/2002 | Johnson, Jr. ................. 363/123 |
| 6,496,395 B2 * | 12/2002 | Tokunaga et al. ............. 363/97 |
| 6,583,947 B1 * | 6/2003 | Hakamata et al. ............. 360/69 |
| 6,795,322 B2 * | 9/2004 | Aihara et al. .................. 363/37 |
| 6,826,005 B2 * | 11/2004 | Hakamata et al. ............. 360/69 |
| 7,023,642 B2 * | 4/2006 | Suzuki et al. ................. 360/71 |
| 2001/0001535 A1 * | 5/2001 | Johnson et al. .............. 323/282 |
| 2003/0107906 A1 * | 6/2003 | Tokunaga et al. ............. 363/89 |
| 2005/0182991 A1 * | 8/2005 | Kawakubo .................... 714/54 |

FOREIGN PATENT DOCUMENTS

JP    2004-126972 A    4/2004

* cited by examiner

*Primary Examiner*—Dismery E Mercedes
(74) *Attorney, Agent, or Firm*—Antonelli, Terry, Stout & Kraus, LLP.

(57) ABSTRACT

Provided is a highly reliable disk array device. Specifically, this disk array device has a number of hard disk drives for respectively storing data, and which converts a first direct voltage supplied to each of the hard disk drives via a common power supply bus into a second direct voltage required by the hard disk drives at each of the hard disk drives, wherein each of the hard disk drives includes a voltage converter for converting the first direct voltage into the second direct voltage; a control unit for controlling the voltage converter so as to suppress the fluctuation of the second direct voltage based on the second direct voltage output from the voltage converter; and a response characteristics switching unit for switching the response characteristics of the control unit against the fluctuation of the second direct voltage so as to improve the response characteristics of the control unit against the fluctuation of the second direct voltage when a transitional voltage fluctuation of the second direct voltage occurs.

8 Claims, 22 Drawing Sheets

DISK ARRAY DEVICE

CROSS-REFERENCES TO RELATED APPLICATIONS

This application relates to and claims priority from Japanese Patent Application No. 2005-136328, filed on May 9, 2005, the entire disclosure of which is incorporated herein by reference.

BACKGROUND OF THE INVENTION

1. Field of the Invention

The present invention generally relates to a disk array device, and in particular to a disk array device that supplies a direct voltage to the respective hard disk drives via a common power supply bus, and converts this direct voltage into a 12V or 5V direct voltage required for its own operation with a DC-DC converter provided to each of the hard disk drives.

2. Description of the Related Art

Conventionally, a hard disk drive requires two types of direct voltages as the drive voltage; namely, a 12V for driving the hard disk or magnetic head, and a 5V for driving the built-in boards. Thus, with a conventional disk array device that operates a plurality of hard disk drives in a RAID (Redundant Array of Inexpensive Disks) format, 5V and 12V direct voltages are generated in the AC-DC switching power supply positioned at the power supply input of the device, and these are respectively supplied to each of the hard disk drives via a common power supply path.

Nevertheless, with this kind of feeding system, when the 5V or 12V feed line on the common power supply path short circuits in the ground, there is a problem in that the operation of every hard disk drive receiving such feed would stop and cause a system failure.

As a method for overcoming these problems, a method has been proposed for supplying the direct voltage to the respective hard disk drives via two feed lines without separating the feed line for 5V and 12V (providing redundant feed lines), providing a DC-DC converter to each of the hard disk drives, and generating a 5V or 12V direct voltage required for the operation of the disk drive in each of the hard disk drives based on the direct voltage obtained via the feed line (Japanese Patent Laid-Open Publication No. 2004-126972). According to this method, even when a failure occurs to one of the feed lines being used normally, power can be supplied to the respective hard disk drives via the other feed line, and a system failure can be prevented thereby.

SUMMARY OF THE INVENTION

Nevertheless, according to the foregoing method, since the position of the hard disk drive and DC-DC converter will be extremely close, there is a possibility that the hard disk drive may malfunction due to the field noise of the DC-DC converter (radio waves generated due to a high frequency surge). In particular, since a transient current, which is a cause for generating field noise, will occur in the 12V voltage during the seek operation and in the 5V voltage during the subsequent reading and writing of data from and to the hard disk, the suppression of such transient current is important in preventing the malfunction of the hard disk drives.

Further, when this transient current is generated, a voltage fluctuation will occur in the 12V or 5V supply voltage to be supplied to the hard disk drive. And, when the supply voltage exceeds the tolerable voltage fluctuation range of the hard disk drive due to such voltage fluctuation, there is a problem in that the hard disk drives may break down.

The present invention was devised in view of the foregoing problems, and an object thereof is to provide a highly reliable disk array device capable of effectively preventing the malfunction or breakdown of the hard disk drives.

The present invention for achieving the foregoing object is a disk array device having a plurality of hard disk drives for respectively storing data, and which converts a first direct voltage supplied to each of the hard disk drives via a common power supply bus into a second direct voltage required by the hard disk drives at each of the hard disk drives, wherein each of the hard disk drives includes: a voltage converter for converting the first direct voltage into the second direct voltage; a control unit for controlling the voltage converter so as to suppress the fluctuation of the second direct voltage based on the second direct voltage output from the voltage converter; and a response characteristics switching unit for switching the response characteristics of the control unit against the fluctuation of the second direct voltage so as to improve the response characteristics of the control unit against the fluctuation of the second direct voltage when a transitional voltage fluctuation of the second direct voltage occurs.

As a result, with this disk array device, the transitional voltage fluctuation generated in the second direct voltage during the seek operation of the hard disk drive or during the reading or writing of data from and to the hard disk can be reliably suppressed.

According to the present invention, the generation of a field noise caused by the transitional voltage fluctuation generated in the second direct voltage can be effectively prevented, and the malfunction of hard disk drives due to this transitional voltage fluctuation exceeding the tolerable voltage fluctuation range can be effectively prevented, and a highly reliable disk array device can be realized thereby.

DETAILED DESCRIPTION OF THE PREFERRED EMBODIMENTS

An embodiment of the present invention is now described in detail with reference to the attached drawings.

Figure 1:
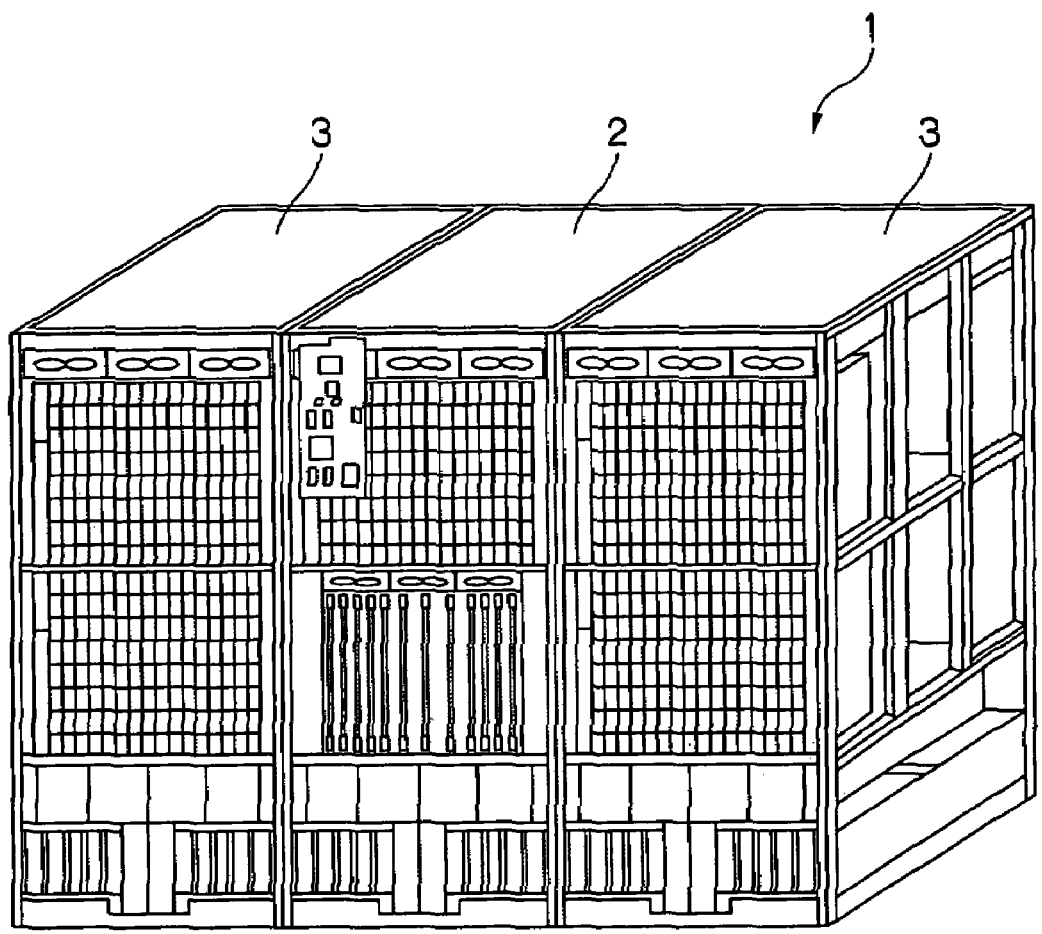
FIG. 1 is a schematic perspective view showing the exterior configuration of a disk array device according to the present embodiment.

(1) First Embodiment (1-1) Exterior Configuration of Disk Array Device in Present Embodiment FIG. 1 to FIG. 4 show the exterior configuration of a disk array device 1 according to the present embodiment. The disk array device 1, as shown in FIG. 1, is configured from a control device 2 and a driver 3.

Figure 2:
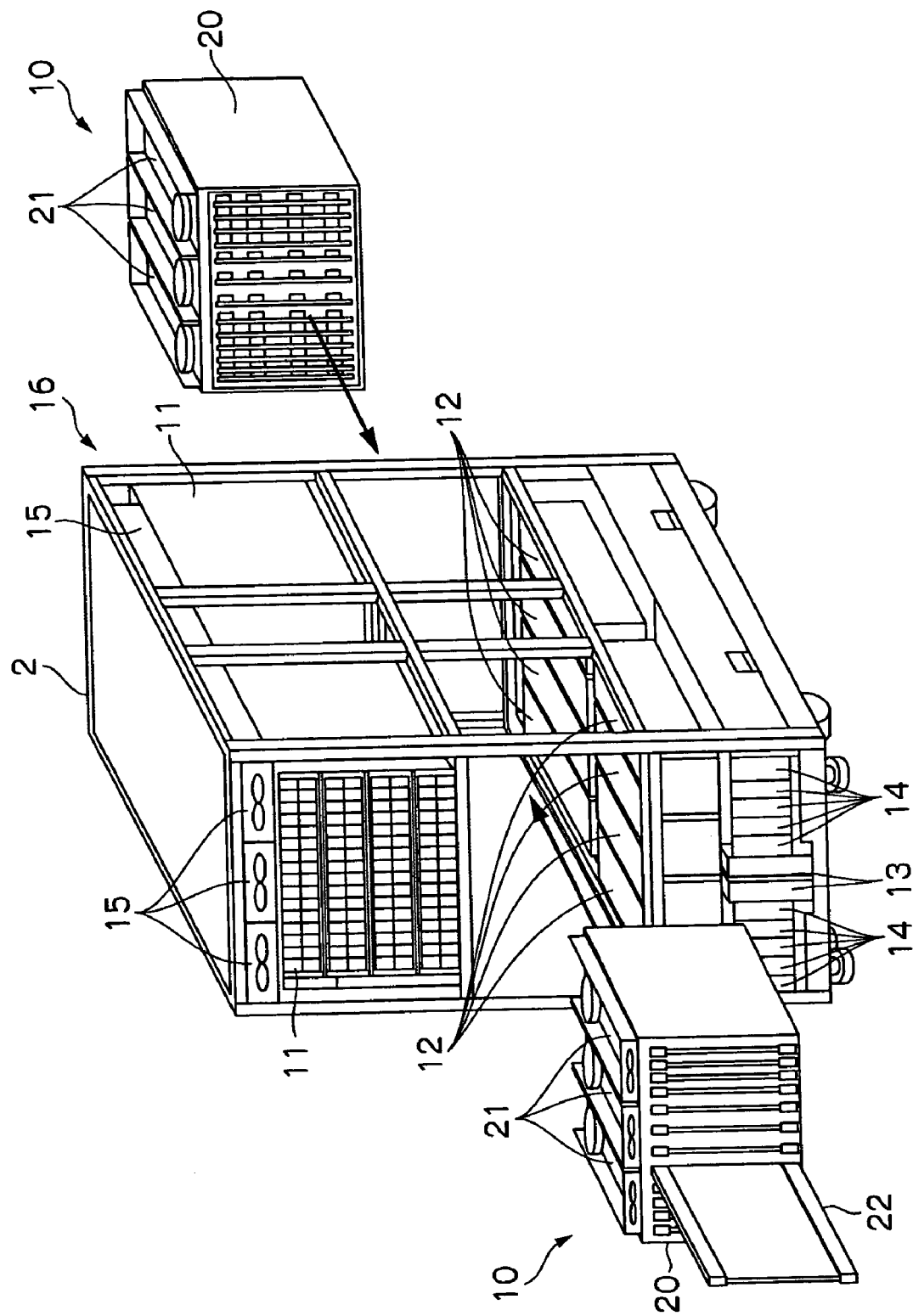
FIG. 2 is a schematic exploded perspective view showing the exterior configuration of a control device.
Figure 3:
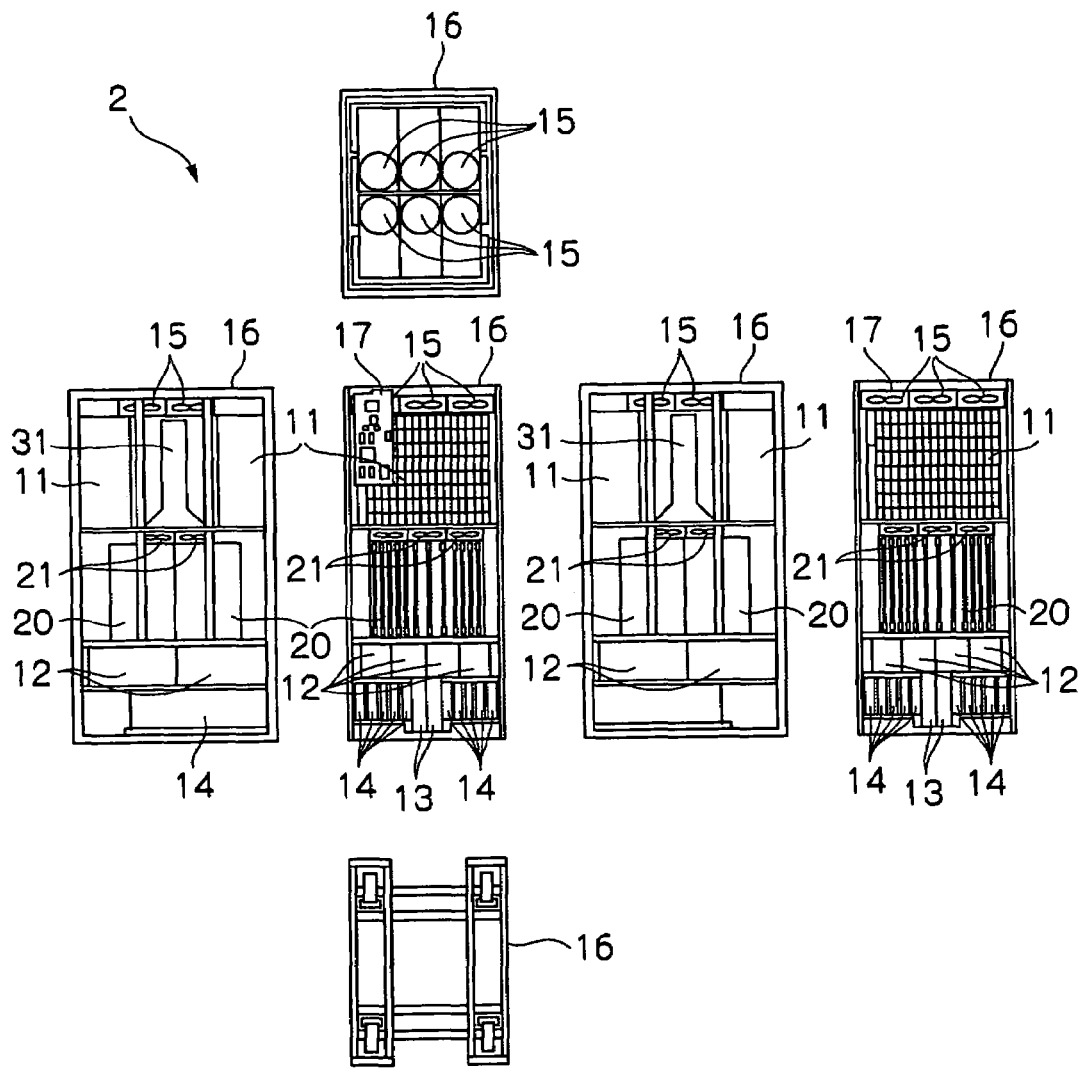
FIG. 3 is a schematic hexagonal diagram showing the exterior configuration of a control device.

The control device 2, as shown in FIG. 2 and FIG. 3, is constituted by housing a logical module 10, a hard disk drive module 11, an AC-DC power source 12, an AC-BOX 13, a battery 14 and a fan 15 in a case 16. An operator panel 17 (FIG. 3) to be operated by the operator in charge of the maintenance management of the disk array device 1 is provided to the control device 2.

As evident from FIG. 2, the logical module 10 has a logical unit 20 for performing the overall control of the disk array device 1, and a logical module fan 21, and is detachably housed in the case 16. A logical board 22 as a control board for performing various control operations relating to the data I/O processing of the hard disk drive 23 (FIG. 5) is detachably aligned and housed in the logical unit 20.

As the logical board 22 to be housed in the logical unit 20, for example, there are a channel adapter 31 (FIG. 5) for communicating with a host system (hereinafter referred to as a "host system") which uses the disk array device 1 as a memory device to input and output data, and a disk adapter 35 (FIG. 5) for processing the input and output of data to and from the hard disk drive 30. These will be described later.

The logical module fan 21 is used for discharging the air inside the logical unit 20, and the inside of the logical unit 20 can be cooled thereby.

The hard disk drive module 11 houses a plurality of hard disk drives 23 for storing data, and is housed detachably in the case 16. The hard disk drive 23 is a device with a built-in hard disk for storing data.

The fan 15 is used for externally discharging the air inside the control device 2, and the heat generated in the hard disk drive module 11 can thereby be discharged outside the control device 2. Further, an air duct 31 is provided inside the case 16 as shown in FIG. 3, and the heat generated in the logical module 10 housed in the middle deck of the case 16 can thereby be discharged outside the control device 2 with the fan 15 via the inside of such air duct 31.

The AC-DC power source 12 converts the AC power into DC power and supplies such DC power to the logical module 10 and hard disk drive 23. The battery 14 is used as the standby power supply for supplying power to the respective devices inside the control device 2 upon an electric power failure or abnormality of the power source module 12. The AC-BOX 13 is the intake of the AC power in relation to the disk array device 1, and functions as a breaker. The AC power taken in by the AC-BOX 13 is supplied to the AC-DC power source module 12.

Figure 4:
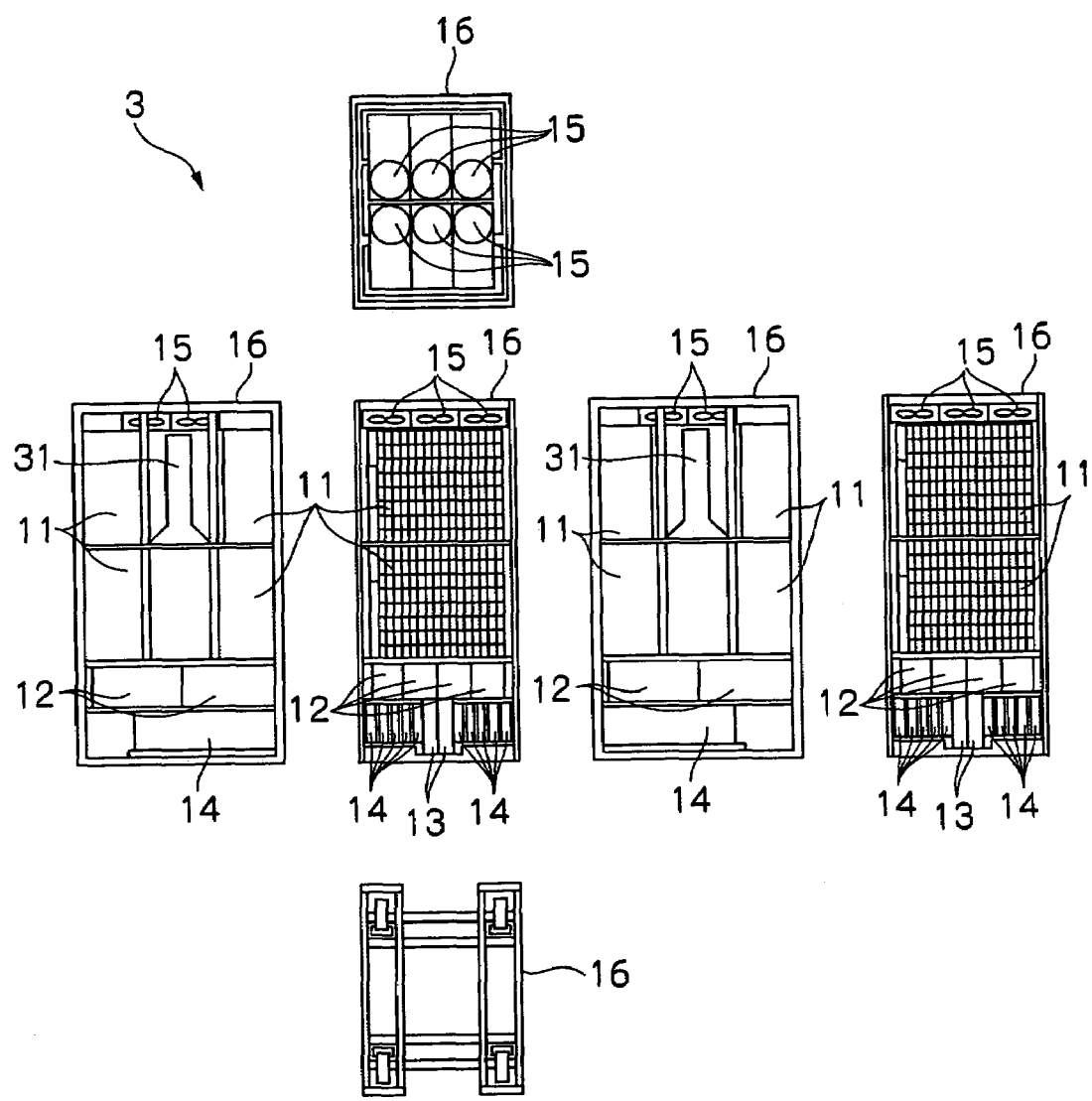
FIG. 4 is a schematic hexagonal diagram showing the exterior configuration of a driver.

Meanwhile, the driver 3, as shown in FIG. 4, is configured by housing a hard disk drive module 11, an AC-DC power source 12, an AC-BOX 13, a battery 14 and a fan 15 in a case 16. These modules are the same as those used in the control device 2. With the disk array device 1 according to the present embodiment, both the control device 2 and driver 3 use a common case 16. And, the driver 3 is configured by housing a hard disk drive module 11 in place of the logical module 20 in the middle deck of the case 16 housing the logical module 20 in the control device 2.

(1-2) Internal Configuration of Disk Array Device in Present Embodiment

Figure 5:
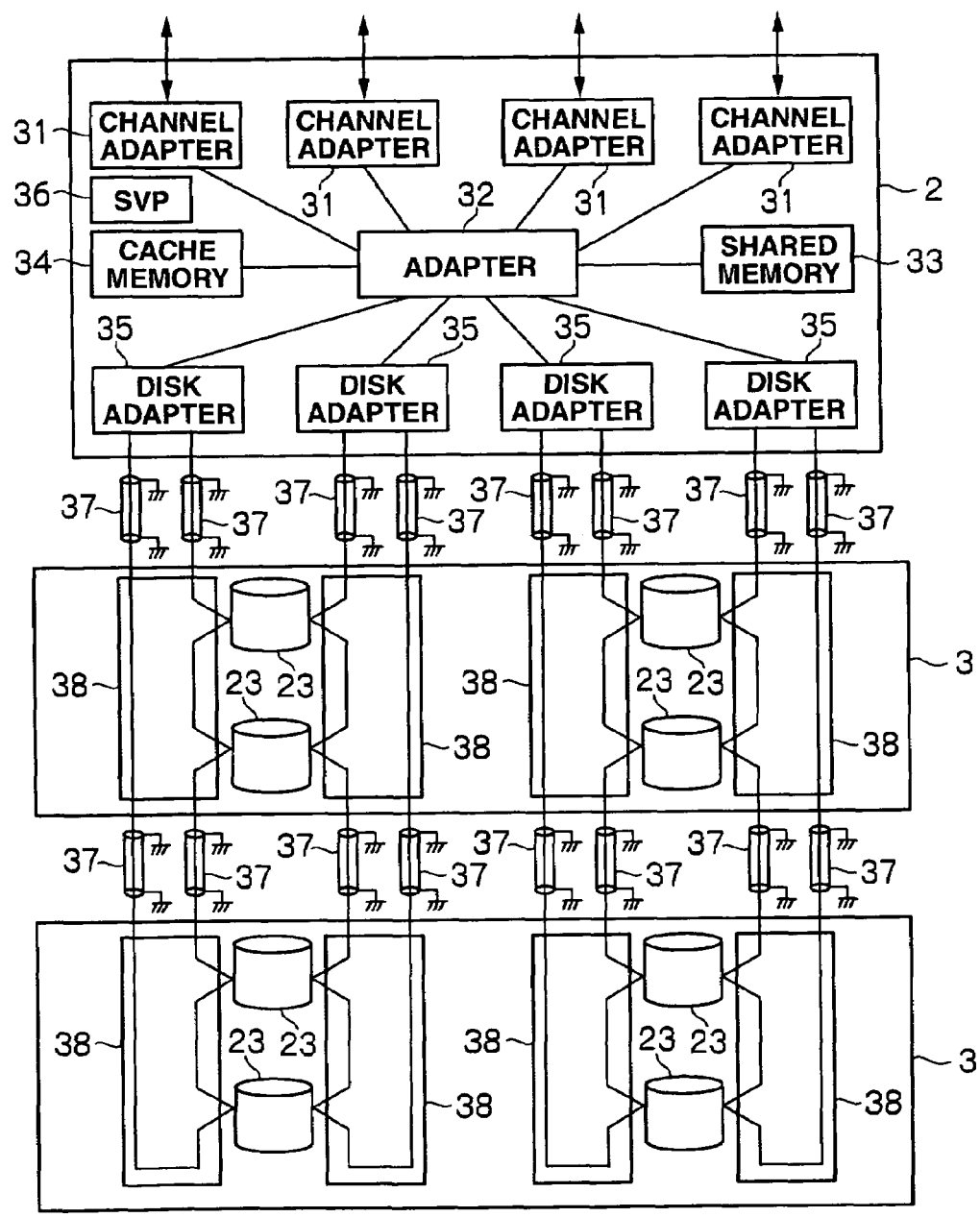
FIG. 5 is a block diagram schematically showing the internal configuration of a disk array device according to the present embodiment.

FIG. 5 shows the internal configuration of this disk array device 1. Incidentally, in FIG. 5, the hard disk drive module 11 in the control device 2 has been omitted.

As evident from FIG. 5, the control device 2 has a control unit including a plurality of channel adapters 31, an adapter 32, a shared memory 33, a cache memory 34, a plurality of disk adapters 35 and a management terminal 36. The channel adapter 31, adapter 32, shared memory 33, cache memory 34 and disk adapter 35 are formed on the logical board 22 housed in the foregoing logical unit 20 described with reference to FIG. 2 and FIG. 3.

Each of the channel adapters 31 is constituted as a microcomputer system including a microprocessor, memory, communication interface and so on, respectively, and has a port to be connected to the likes of a network. The channel adapter 31 interprets and executes various commands transmitted from the host system via a network. The port of each channel adapter 31 is assigned a network address (e.g., IP address or WWN) for identifying each of such ports, and, thereby, each of the channel adapters 31 is able to individually act as a NAS (Network Attached Storage).

The adapter 32 is connected to the channel adapter 31, shared memory 33, cache memory 34 and disk adapter 35. The transfer of data and commands among the channel adapter 31, shared memory 33, cache memory 34 and disk adapter 35 is conducted via this adapter 32. The adapter 32, for instance, is constituted from a switch or bus such as an ultrahigh-speed crossbar switch which performs data transmission via high-speed switching.

The shared memory 33 and cache memory 34 are storage memories to be shared by the channel adapter 31 and disk adapter 35. The shared memory 33 is primarily used for storing control information and commands, and the cache memory 34 is primarily used for temporarily storing data to be input to and output from the driver 3.

Each of these disk adapters 35 is connected communicably to the hard disk drive 23 storing data, and performs reading/writing processing of data to the hard disk drive 23 according to the data I/O request from the host system. The reading and writing of data, for instance, is conducted via a communication path constituting a loop set forth by FC-AL, which is a fibre channel standard (hereinafter sometimes referred to as an "FC-AL loop"). The communication path is constituted by including a disk adapter 35, a communication cable 37, an FSW (Fiber Switch PCB) 38 and a hard disk drive 23. Communication between the disk adapter 35 and hard disk drive 23 is relayed with the FSW 38 provided to the driver 3.

The management terminal 36 is used for controlling the overall operation of the disk array device 1 and, for example, is constituted from the likes of a laptop personal computer. The management terminal 36 is connected to the respective channel adapters 31 via a first LAN not shown, and connected to the respective disk adapters 35 via a second LAN not shown. The management terminal 36 monitors the occurrence of failures in the disk array device 1, and, when a failure occurs, it notifies such failure to an external management device, and performs processing for designating the inhibition of the hard disk drive 23 based on the order provided from the external management device according to the operator's operation.

Each driver 3 is constituted as a microcomputer system having a communication interface among the microprocessor, memory and control device 2, and controls the input and output of data of the respective hard disk drives 23 based on the data I/O request from the host system provided via the control device 2.

The hard disk drive 23 is constituted, for instance, by having a built-in expensive disk drive such as a SCSI (Small Computer System Interface) disk, or an inexpensive disk device such as a SATA (Serial AT Attachment) disk or optical disk. One or a plurality of logical volumes (this is hereinafter referred to as a "logical volume") is set on the physical memory area provided by one or a plurality of disk devices. This data is stored in the logical volume.

The flow of input and output of data in this disk array device 1 is now explained. When a command for writing data in a prescribed logical volume in the disk array device 1 is given pursuant to the user's operation, the host system transmits the corresponding data write request and the data to be written to the control device 2 of the disk array device 1.

When the channel adapter 31 of the disk array device 1 receives this data write request from the host system, it writes a write command in the shared memory 33, and writes data to be written in the cache memory 34. Meanwhile, the disk adapter 35 is constantly monitoring the shared memory 33, and, when the disk adapter 35 detects that a write command has been written in the shared memory 33, it converts the data write request based on a logical address designation into a data write request based on a physical address designation, and transmits this to the corresponding driver 3 via the communication cable 37. Further, the disk adapter 35 reads data to be written from the cache memory 34 according to the write command written in the shared memory 33, and transmits this to the driver 3 via the communication cable 37.

When the data write request is provided from the control unit 33 of the control device 2, the driver 3 writes the data to be written in an address location designated in the hard disk in the hard disk drive 23 by controlling the corresponding hard disk drive 23 according to this data write request.

Contrarily, when a command for reading data stored in a prescribed logical volume in the disk array device 1 is given pursuant to the user's operation, the host system transmits the corresponding data read request to the control device 2 of the disk array 1.

The channel adapter 31 of the control device 2 that received such data read request writes a read command in the shared memory 33. Further, when the disk adapter 35 detects that a read command has been written in the shared memory 33, it converts the data read request based on a logical address designation into a data read request based on a physical address designation, and transmits this to the driver 3 via the communication cable 37.

When a data read request is provided from the control device 2, the driver 3 reads the data to be read from the address location designated in the hard disk of the hard disk drive 23 by controlling the corresponding hard disk drive 23 according to such data read request. The driver 3 transmits this read data (this is hereinafter referred to as the "read data") to the corresponding disk adapter 35 of the control device 2 via the communication cable 37.

The disk adapter 35 that received the read data writes a read command in the shared memory 33, and writes such read data in the cache memory 34. Meanwhile, the channel adapter 31 is constantly monitoring the shared memory 33, and, when the channel adapter 31 detects that a read command has been written in the shared memory 33, it reads the read data from the cache memory 34 according to this read command, and transmits this to the corresponding host system.

(1-3) Configuration of Hard Disk Drive

Next, the configuration of the hard disk drive 23 and the feeding method to the hard disk drive 23 according to the present embodiment are explained.

Figure 6:
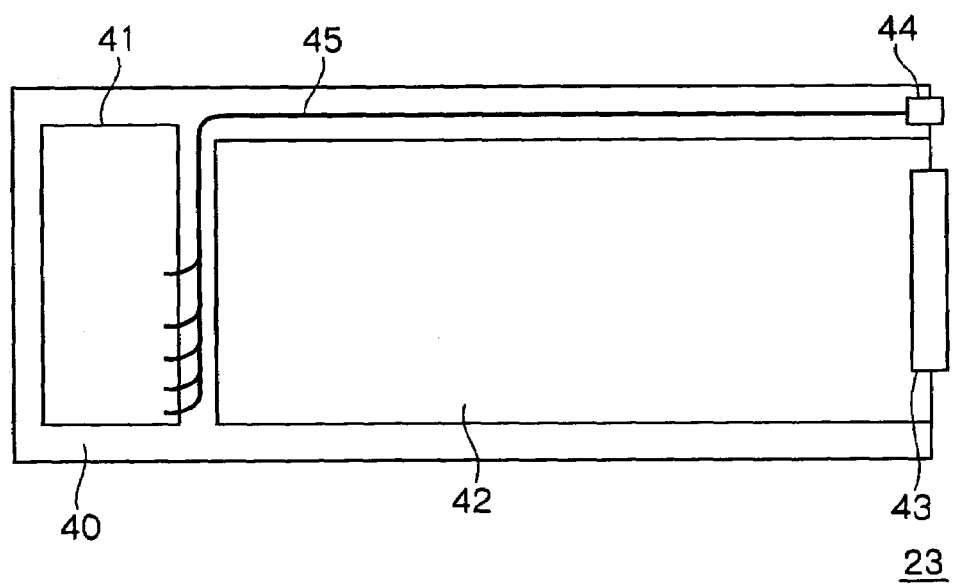
FIG. 6 is a schematic diagram explaining the configuration of a hard disk drive.

FIG. 6 shows the configuration of the hard disk drive 23 used in the disk array device 1. The hard disk drive 23 according to the present embodiment is configured by a DC-DC converter 41 being housed in one end of a case 40, and a hard disk drive body 42 being stored in the other end thereof.

A hard disk drive connector 43 for connecting to a motherboard not shown housed in the hard disk drive module 11 (FIG. 1 to FIG. 4) is provided to one terminal of the case 40, and the hard disk drive body 42 performs the input and output of data to be read and various commands such as the data I/O request via this hard disk drive connector 43, and the feeding of the power supply voltage required by the hard disk drive is also conducted.

Further, a DC-DC converter I/O connector 44 is also provided to one terminal of the case 40 separate from the hard disk connector 43, and, via this DC-DC converter I/O connector 44 and the DC-DC converter I/O cable 45 laid in the case 40, power from the AC-DC power source 12 (FIG. 2 to FIG. 4) is input to the DC-DC converter 41, the 12V and 5V voltages obtained by subjecting this power supply voltage to DC-DC conversion in the DC-DC converter 41 are output, and such voltages are supplied to the hard disk drive body 42 via the foregoing motherboard not shown and the hard disk connector 43.

(1-4) Configuration of Mechanism for Supplying Power to Hard Disk Drive

Figure 7:
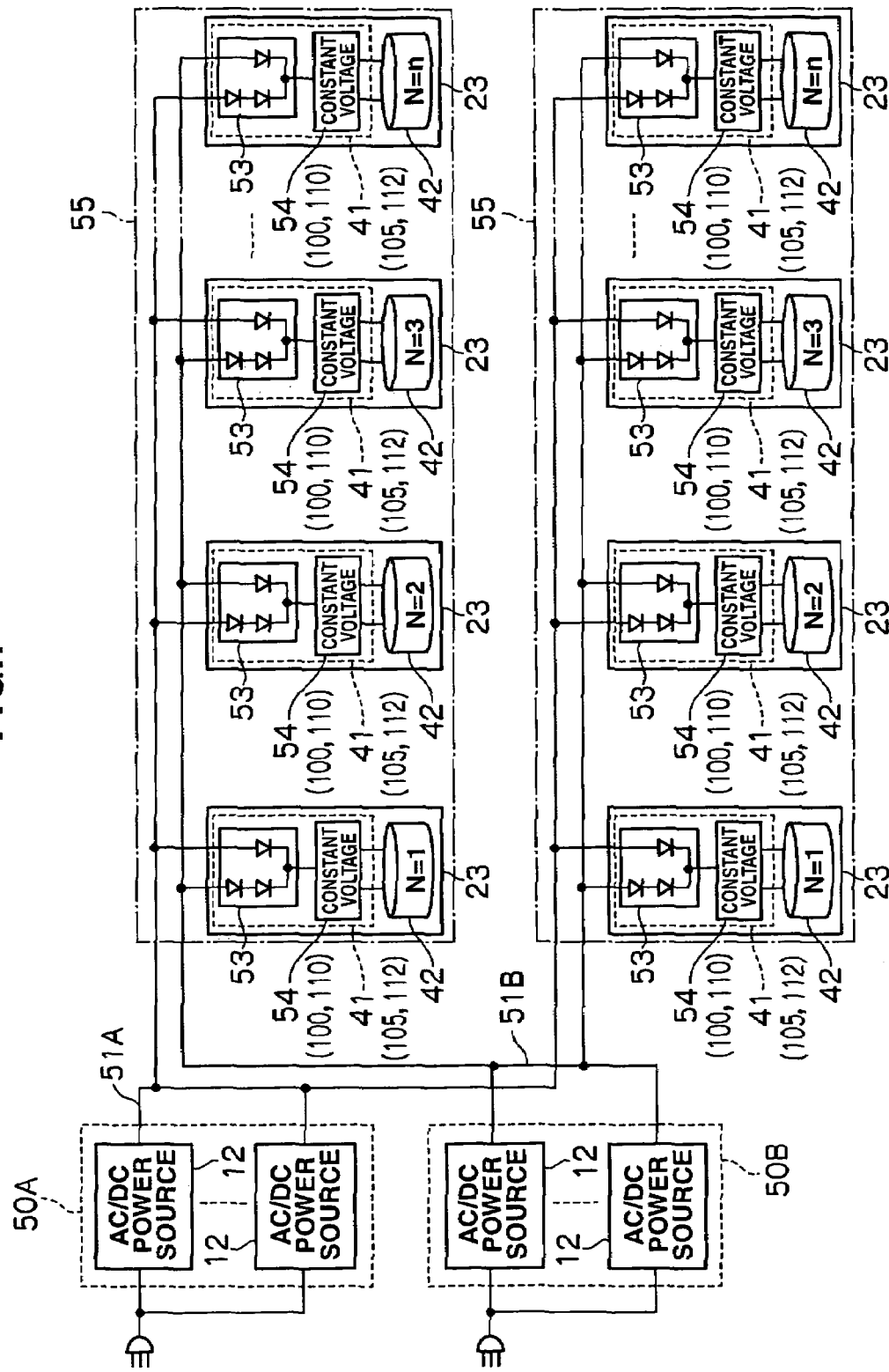
FIG. 7 is a block diagram showing a power supply system in a disk array device according to the present embodiment.

FIG. 7 shows the configuration of the power supply mechanism relating to the supply of power to the respective hard disk drives 23 in the disk array device 1. As shown in FIG. 7, with this disk array device 1, a plurality of AC-DC power sources 12 is separated into two systems, and the 12 to 48V supply voltage output from the respective AC-DC power sources 12 of one system (this is hereinafter referred to as a "first power supply system 50A") is supplied to the respective hard disk drives 23 via the first common power supply path 51A, and the 12 to 48V supply voltage output from the respective AC-DC power sources 12 of the other system (this is hereinafter referred to as a "second power supply system 50B") is supplied to the respective hard disk drives 23 via the second common power supply path 51B.

The hard disk drive 23 has a DC-DC converter 41 inside the case 40 as described above. This DC-DC converter 41 is constituted from a reverse current prevention circuit 53 and a constant voltage circuit 54.

The reverse current prevention circuit 53 has a second reverse current prevention diode unit formed from one diode, and a first reverse current prevention diode unit constituted by serially connecting a set of two diodes in the forward direction, and is constituted by the cathode of the diode of the first reverse current prevention diode unit and the cathode of the first diode in the forward direction of the second reverse current prevention diode being connected.

The diode constituting the first reverse current prevention diode unit and the two diodes constituting the second reverse current prevention diode unit are the same electronic components having the same ON resistance. Thus, the first reverse current prevention diode unit may be set to have a lower ON resistance than the second reverse current prevention diode unit. Upon realizing this setting, the second reverse current prevention diode unit may be constituted with a diode having an ON resistance that is one higher than the first reverse current prevention diode unit.

And, for each hard disk drive group 55 formed from a plurality of hard disk drives 23 supplied with the series of same supply voltages, with respect to the odd numbered hard disk drives 23 counted from the left side of the diagram, feeding from the first power supply system 50A is enabled by connecting the first common power supply path 51A to the anode of the diode constituting the first reverse current prevention diode unit thereof, and feeding from the second power supply system 50B is enabled by connecting the second common power supply path 51B to the anode of the second diode in the forward direction constituting the second reverse current prevention diode unit thereof.

Meanwhile, for each hard disk drive group 55, with respect to the even numbered hard disk drives 23 counted from the left side of the diagram, feeding from the second power supply system 50B is enabled by connecting the second common power supply path 51B to the anode of the diode constituting the first reverse current prevention diode unit thereof, and feeding from the first power supply system 50A is enabled by connecting the first common power supply path 51A to the anode of the second diode in the forward direction constituting the second reverse current prevention diode unit thereof.

With the reverse current prevention circuit 53 having the foregoing constitution, during normal operation without any power failure, in each of the hard disk drives 23, feeding from the first power supply system 50A or second power supply system 50B is preferentially provided to the constant voltage generator 54 via the first reverse current prevention diode unit having a low ON resistance. Meanwhile, even when there is a power failure and the feeding from the first or second power supply system 50A, 50B via the first reverse current prevention diode unit having a low ON resistance is discontinued, feeding from the second or first power supply system 50B, 50A having a high ON resistance will be provided to the constant voltage generator 54.

Figure 8:
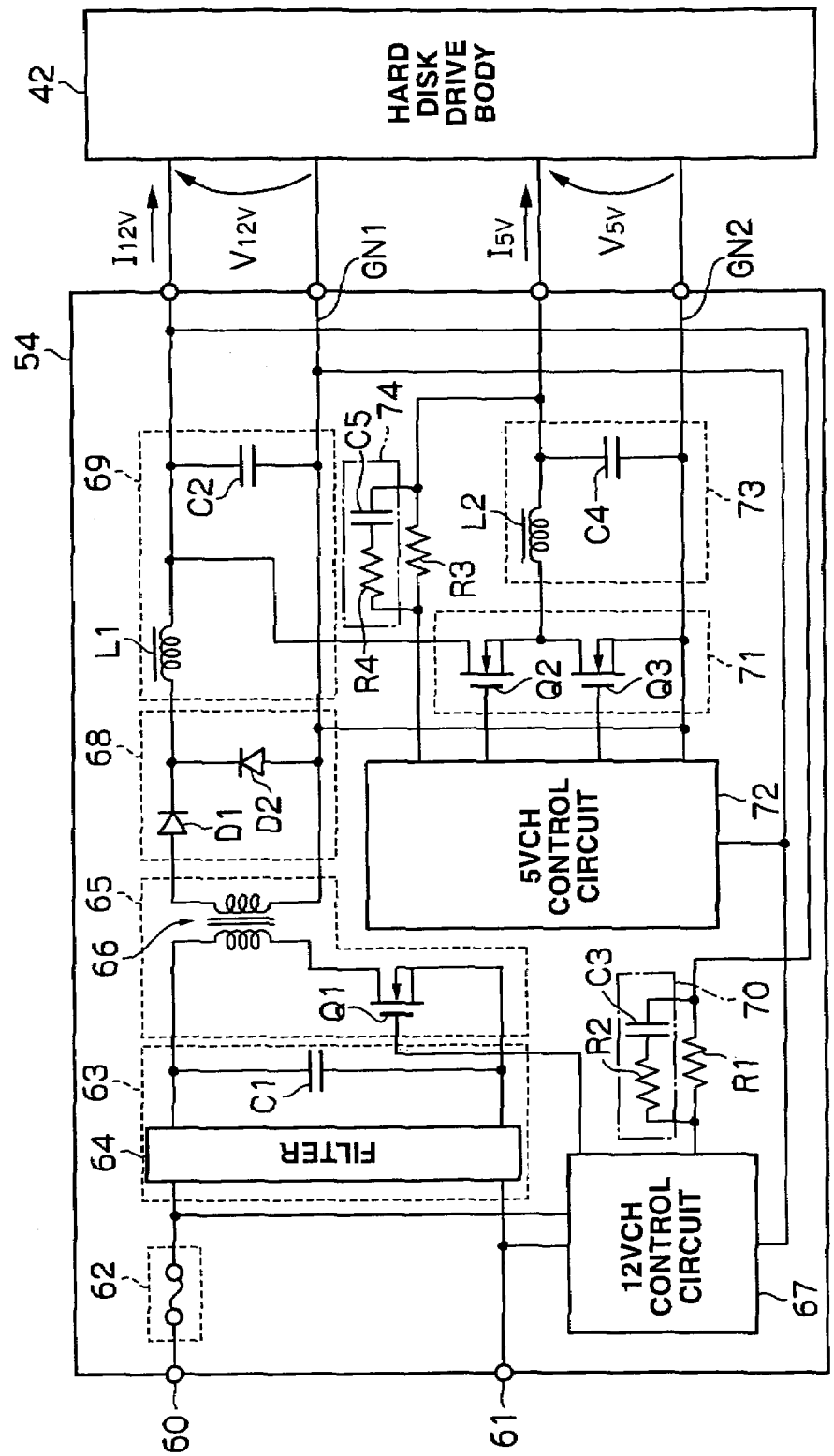
FIG. 8 is a schematic circuit diagram showing the configuration of a constant voltage circuit of a DC-DC converter according to the first embodiment.

The constant voltage circuit 54, as shown in FIG. 8, has an input terminal 60 for inputting the supply voltage from the reverse current prevention circuit 53, and a ground terminal 61 connected to the ground. And, the input terminal 60 is connected to an input filter unit 63 via an excess current protection circuit 62 formed from a fuse, and the ground terminal 61 is directly connected to the input filter unit 63.

The input filter unit 63 is configured from a filter 64 and a capacity C1 connected in parallel between the input terminal 60 and ground terminal 61, and eliminates the noise components contained in the 12 to 48V supply voltage supplied via the input terminal 60. The output of this input filter unit 63 is provided to the power converter 65.

The power converter 65 is configured from a serially connected transformer 66 and MOS (Metal Oxide Semiconductor) type FET (Field Effect Transistor) Q1, and inputs the supply voltage, in which the noise was eliminated with the input filter unit 63, in the primary side coil. Further, the MOS type FET Q1 is turned ON/OFF by being subject to PWM (Pulse Width Modulation) control by the 12V channel control circuit 67. Thereby, an induced voltage is generated in the secondary side coil of the transformer 66 according to the current fluctuation of the primary side coil of the transformer 66 pursuant to the ON/OFF of the MOS type FET Q1, and this is output to a 12V channel rectifier 68.

The 12V channel rectifier 68 is configured by connecting the respective cathodes with a first diode D1 in which an anode is connected to the 12V output terminal of the secondary side coil of the transformer 66, and a second diode D2 in which an anode is connected to the 12V output terminal of the secondary side coil of the transformer 66, performs full-wave rectification to the output voltage of the power converter 65, and outputs the obtained rectified voltage to a 12V channel smoother 69.

The 12V channel smoother 69 is configured from a choke coil L1 in which one terminal thereof is connected to a connection median of the respective cathodes of the first and second diodes D1, D2 in the 12V channel rectifier 68, and a capacitor C2 connected between the other terminal of the choke coil L1 and a first ground line GL1, and smoothes the rectified voltage supplied from the 12V channel rectifier 68. And, the 12V channel smoother 69 supplies the 12V direct voltage formed from the obtained 12V channel output voltage to the hard disk drive body 42 in the same case 40 (FIG. 6).

Further, a part of the 12V channel output current formed from the output current of the 12V channel smoother 69 is subject to current-voltage conversion with a first current-voltage conversion resistance R1 provided in the feedback loop of the 12V channel and then provided to the 12V channel control circuit 67. Then, the 12V channel control circuit 67 constantly monitors the voltage value of the voltage provided via this first current-voltage conversion resistance R1, and performs PWM control to the MOS type FET Q1 of the power converter 65 such that this will become a prescribed value where the 12V channel output voltage will be 12V. Thereby, fluctuation of the 12V channel output voltage can be suppressed, and this output voltage is maintained at 12V.

Figure 9:
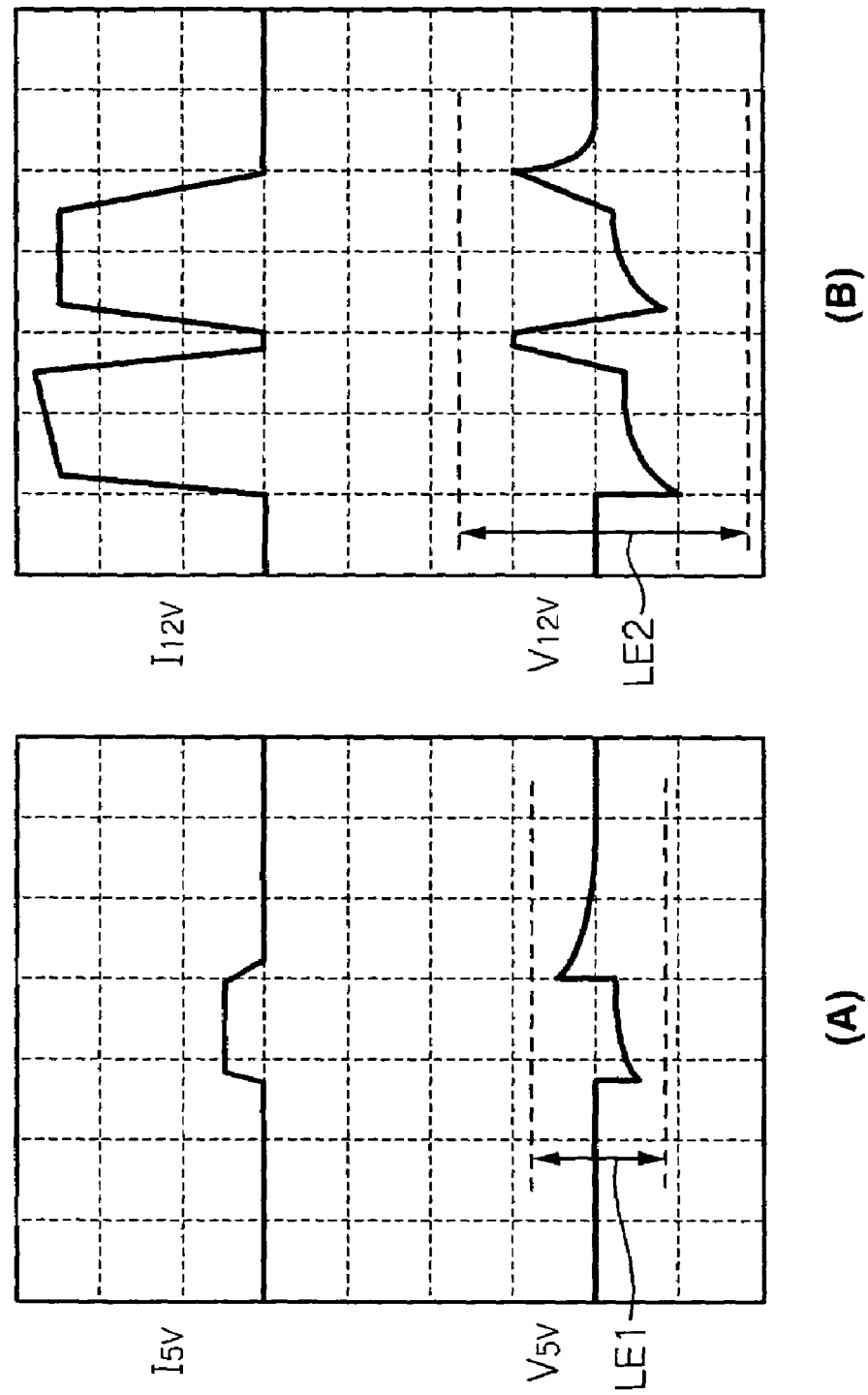
FIG. 9(A) is a waveform diagram explaining the voltage fluctuation of an output voltage in the constant voltage circuit illustrated in FIG. 8.
FIG. 9(B) is a waveform diagram explaining the voltage fluctuation of an output voltage in the constant voltage circuit illustrated in FIG. 8.

Further, the first phase compensation circuit 70 formed from a resistance R2 and a capacitor C3 is serially connected to the first current-voltage conversion resistance R1. Here, as the resistance R2 of the first phase compensation circuit 70, resistance that is considerably smaller than the first current-voltage conversion resistance R1 is used. Thereby, when a transient current as illustrated in the upper section of FIG. 9(B) is generated in the 12V channel output current due to the seek operation of the hard disk drive body 42, this transient current will flow toward the first phase compensation circuit 70 having a lower resistance between the first current-voltage conversion resistance R1 and first phase compensation circuit 70, and the transient current is subject to current-voltage conversion based on the resistance R2 of this first phase compensation circuit 70 and then provided to the 12V channel control circuit 67.

And, when the flow of the transient current is changed as described above, the resistance of the overall feedback loop of the 12V channel (including the resistance in the 12V channel control circuit 67) will drop according to the difference between the first current-voltage conversion resistance R1 and the resistance R2 of the first phase compensation circuit 70, and, as a result, the gain of this feedback loop will increase, and the response characteristics are switched so as to be improved. As a result, for instance, when the first phase compensation circuit 70 does not exist, the overshoot generated during the falling edge or rising edge of the transitional voltage fluctuation as depicted in the lower section of FIG. 9(B) generated pursuant to the fluctuation of the 12V channel output current during the seek operation depicted in the upper section of FIG. 9(B) can be suppressed by improving the response characteristics of the feedback loop as illustrated in FIG. 9(B), and the fluctuation of the 12V channel output voltage can be suppressed to be within a prescribed tolerable voltage fluctuation range LE2. Incidentally, in FIG. 9(B), the pulse on the middle left side of the diagram is a current fluctuation generated when the magnetic head starts moving, and the pulse in the middle right side of the diagram is a current fluctuation generated when the moving magnetic head is stopped. The same applies in the following explanation.

Meanwhile, a synchronous rectifier 71 formed from serially connecting the first and second MOS type FETs Q2, Q3 is provided between the connection median of the choke coil L1 and capacitor C2 of the 12V channel smoother 69, and a second ground line GN2. The first and second MOS type FETs Q2, Q3 of the synchronous rectifier 71 are subject to PWM control such that they are sequentially and alternately turned ON based on the gate voltage provided sequentially and alternately from the 5V channel control circuit 72. And the output of this synchronous rectifier 1 is output to a 5V channel smoother 73.

The 5V channel smoother 73 is configured from a choke coil L2 connected to the connection median of the first and second MOS type FETs Q2, Q3 of the synchronous rectifier 71, and a capacitor C4 connected between this choke coil L2 and the second ground line GL2, and smoothes the output voltage of the synchronous rectifier 73. And, the 5V channel smoother 73 supplies the 5V direct voltage formed from the obtained 5V channel output voltage to the hard disk drive body 42 in the same case 40 (FIG. 6).

Further, a part of the 5V channel output current formed from the output current of the 5V channel smoother 73 is subject to current-voltage conversion with a second current-voltage conversion resistance R2 and then provided to the 5V channel control circuit 72. Then, the 5V channel control circuit 72 constantly monitors the voltage value of the voltage provided via this second current-voltage conversion resistance R2, and performs PWM control to the MOS type FETs Q2, Q3 of the synchronous rectifier 71 such that this will become a prescribed value where the 5V channel output voltage will be 5V. Thereby, fluctuation of the 5V channel output voltage can be suppressed, and this output voltage is maintained at 5V.

Further, the second phase compensation circuit 74 formed from a resistance R4 and a capacitor C5 is connected in parallel to the second current-voltage conversion resistance R3. Here, as the resistance R4 of the second phase compensation circuit 74, resistance that is considerably smaller than the second current-voltage conversion resistance R2 is used. Thereby, with this DC-DC converter 41, based on the same principle of operation as in the case of the 12V channel, the fluctuation of the 5V channel output voltage can be suppressed to be within the prescribed tolerable voltage fluctuation range LE1. Incidentally, the upper section of FIG. 9(A) shows a transient current generated in the 5V channel output voltage during the reading and writing of data from and in the hard disk, and the lower section of FIG. 9(A) shows a state suppressing the fluctuation of the 5V channel output voltage caused by the transient current with the second phase compensation circuit 74.

Figure 10:
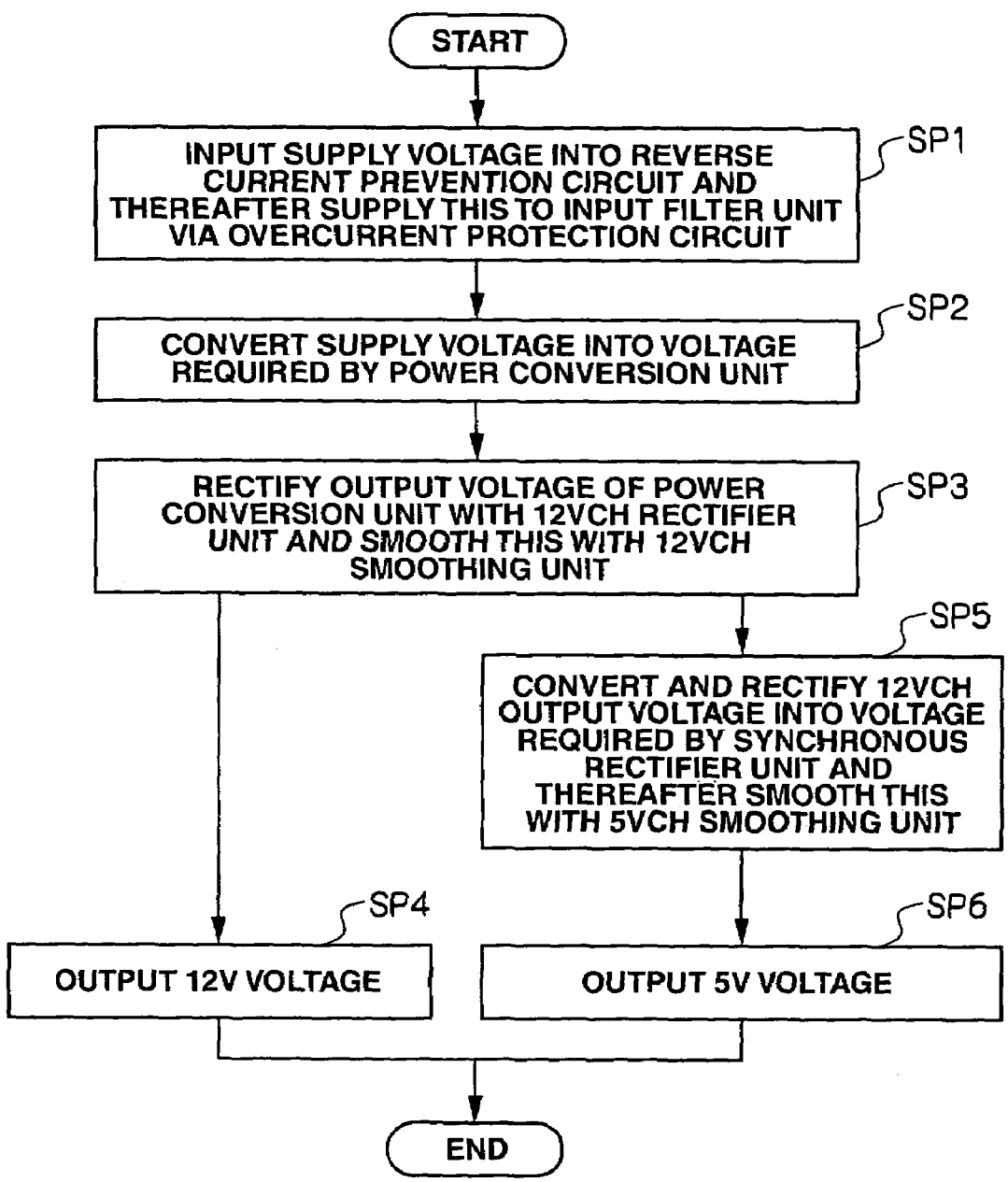
FIG. 10 is a flowchart explaining the operation of the constant voltage circuit illustrated in FIG. 8.

FIG. 10 is a flowchart representing the flow of the series of processing steps until the DC-DC converter 41 outputs the respective 12V and 5V power supply voltages to the hard disk drive body 42. With this DC-DC converter 41, the 12 to 48V supply voltage supplied via the first or second common power supply path 51, 53 is input to the input filter unit 63 sequentially via the reverse current prevention circuit 53 and the excess current protection circuit 62 in the constant voltage circuit 54 so as to further stabilize the filtering processing in this input filter unit 63 (SP1).

And, with the DC-DC converter 41, this stabilized supply voltage is DC-DC converted into the required power supply voltage by performing PWM control to the MOS type FET Q1 of the power converter 66. Here, the 12V channel is sufficiently stable due to the PWM control of the 12V channel control circuit 67 (SP2). Further, with the 12V channel, due to the existence of the first phase compensation circuit 70 provided serially to the first current-voltage conversion resistance R1 in the feedback loop, even when a transient current is generated in the 12V channel, the transitional fluctuation of the 12V channel output voltage can be suppressed to be within the prescribed tolerable voltage fluctuation range LE2.

Moreover, with the DC-DC converter 41, the DC-DC converted voltage is rectified in the 12V channel rectifier 68, smoothed in the 12V channel smoother 69 (SP3), and thereafter output to the hard disk drive body 42 (SP4).

Meanwhile, the DC-DC converter 41 converts and rectifies the 12V channel output voltage into a voltage required in the synchronous rectifier 71 subject to PWM control by the 5V channel control circuit 72. Then the DC-DC converter 41 smoothes this DC-DC converted voltage in the 5V channel smoother 73 (SP5), and thereafter output this to the hard disk drive body 42 (SP6).

Here, in the 5V channel, due to the existence of the second phase compensation circuit 74 provided serially to the second current-voltage conversion resistance R3 in the feedback loop, even when a transient current is generated in the 5V channel, the transitional fluctuation of the 5V channel output voltage can be suppressed to be within the prescribed tolerable voltage fluctuation range LE1.

Thereby, with this DC-DC converter 41, due to the first phase compensation circuit 70 provided in the feedback loop of the 12V channel, the transitional fluctuation of the 12V channel output voltage during the seek operation of the hard disk drive body 42 can be suppressed to be within the prescribed tolerable voltage fluctuation range LE2, and, due to the second phase compensation circuit 74 provided in the feedback loop of the 5V channel, the transitional fluctuation of the 5V channel output voltage during the reading and writing of data from and in the hard disk can be suppressed to be within the prescribed tolerable voltage fluctuation range LE1.

Thus, according to this DC-DC converter 41, the voltage fluctuation resulting from the transient current which causes malfunctions in the hard disk drive 42 can be efficiently reduced. Further, according to this DC-DC converter 41, the voltage fluctuation of both the 12V channel output voltage and 5V channel output voltage can be suppressed to be within the corresponding tolerable voltage fluctuation ranges LE2, LE1 even during the seek operation of the hard disk drive 42 and the subsequent reading and writing of data from and to the hard disk, and damages to the hard disk drive can be effectively prevented thereby.

(2) Second Embodiment

With the DC-DC converter 41 according to the first embodiment described with reference to FIG. 8, two control units of 12V channel and 5V channel (12V channel control circuit 67 and 5V channel control circuit 72) are necessary, and there is a problem in that the circuitry of the DC-DC converter 41 would become complex and increase costs.

Figure 11:
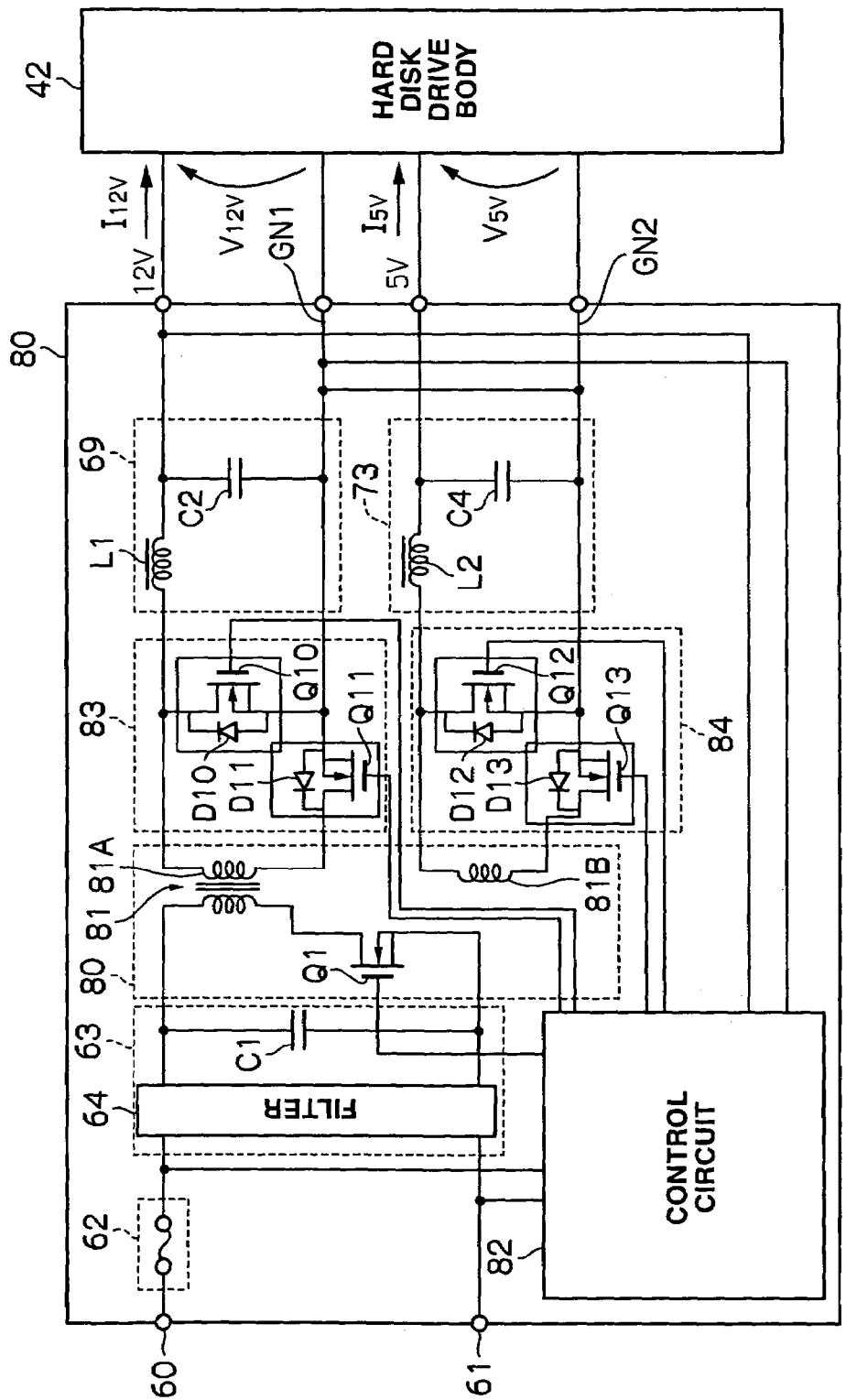
FIG. 11 is a schematic circuit diagram showing a configuration example of a constant voltage circuit of a DC-DC converter.

Thus, the constant voltage circuit of the DC-DC converter 41 may be configured as illustrated in FIG. 11 given the same reference numerals in the components corresponding to those depicted in FIG. 8.

This constant voltage circuit 80 has two coils; namely, a 12V channel secondary side coil 81A and a 5V channel secondary side coil 81B, as the secondary side coil of the transformer 81 in a power converter 80. Further, the MOS type FET Q1 of the power converter 80 is turned ON/OFF by being PWM controlled by a control circuit 82. Thereby, a 12V induced voltage is generated in the 12V channel secondary side coil 81A of the transformer 81 according to the current fluctuation of the primary side coil of the transformer 81 pursuant to the ON/OFF of the MOS type FET Q1, and this is output to a 12V channel rectifier 83.

The 12V channel rectifier unit 83 is configured from a first MOS type FET Q10 connected in parallel to the 12V channel secondary side coil 81A of the transformer 81, and a second MOS type FET Q11 disposed between the source of the first MOS type FET Q10 and the 12V channel secondary side coil 81A. Incidentally, in FIG. 11, D10 represents a parasitic diode of the first MOS type FET Q10, and D11 represents a parasitic diode of the second MOS type FET Q11.

These first and second MOS type FETs Q10, Q11 are turned ON/OFF in a different timing by the control circuit 82 in synchronization with the ON/OFF of the MOS type FET Q1 of the power converter 80. Thereby, a rectified voltage formed by performing full-wave rectification to the output voltage of the 12V channel secondary side coil 81A in the power converter 80 is obtained, and this is smoothed with the 12V channel smoother 69. And, the 12V direct voltage formed from the 12V channel output voltage obtained as a result of the above is supplied to the hard disk drive body 42 in the same case 40.

Meanwhile, an induced current is generated in a 5V channel secondary side coil (this is hereinafter referred to as a "5V channel secondary side coil") of the transformer according to the current fluctuation of the primary side coil of the transformer 81 pursuant to the ON/OFF of the MOS type FET Q1 of the power converter 81, and this is provided to the 5V channel rectifier unit 84.

As with the 12V channel rectifier unit 83, the 5V channel rectifier unit 84 is configured from a first MOS type FET Q12 connected in parallel to the 5V channel secondary side coil 81B of the transformer 81, and a second MOS type FET Q13 disposed between the source of the first MOS type FET Q12 and the 5V channel secondary side coil 81B. Incidentally, in FIG. 11, D12 represents a parasitic diode of the first MOS type FET Q12, and D13 represents a parasitic diode of the second MOS type FET Q13.

These first and second MOS type FETs Q12, Q13 are PWM controlled so as to be turned ON/OFF in a different timing by the 12V channel control circuit 82. Thereby, a rectified voltage formed by performing full-wave rectification to the output voltage of the 5V channel secondary side coil 81B in the power converter 80 is obtained, and this is smoothed with the 5V channel smoother 73. And, the 5V direct voltage formed from the 5V channel output voltage obtained as a result of the above is supplied to the hard disk drive body 42 in the same case 40.

Further, the 12V channel output voltage is also provided to the control circuit 82. The control circuit 82 constantly monitors the 12V channel output voltage, and performs PWM control to the MOS type FET Q1 of the power converter 80 such that this is constantly maintained at 12V.

Figure 13:
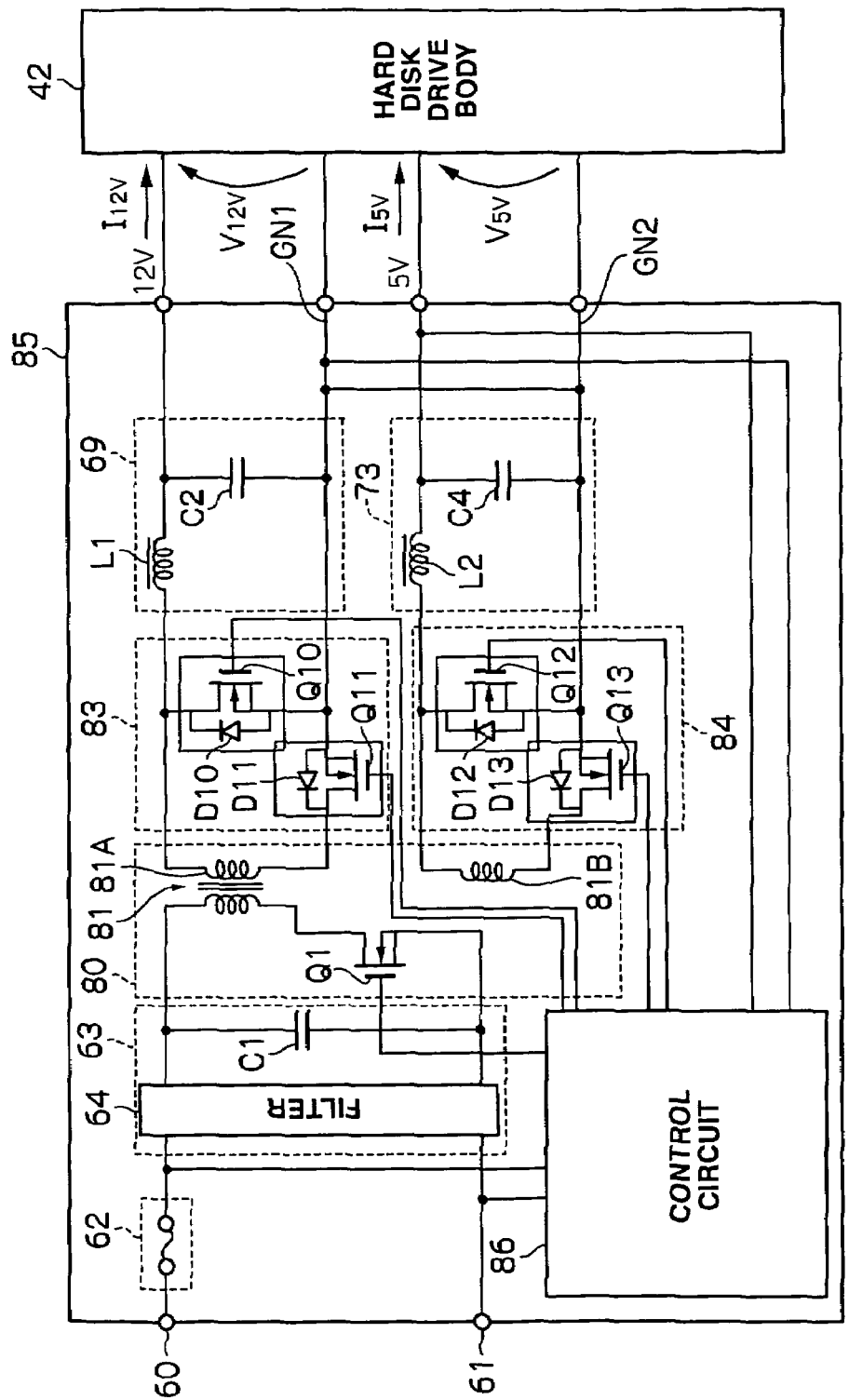
FIG. 13 is a schematic circuit diagram showing a configuration example of a constant voltage circuit of a DC-DC converter.

Meanwhile, FIG. 13 given the same reference numerals in the components corresponding to those illustrated in FIG. 11 shows another configuration example of the DC-DC converter 41. With this constant voltage circuit 85, in place of the output voltage of the 12V channel smoother 69, the output voltage of the 5V channel smoother 73 is provided to the control circuit 86. The control circuit 86 constantly monitors the output voltage of the 5V channel smoother 73, and performs PWM control to the MOS type FET Q1 of the power converter 80 such that this is constantly maintained at 5V.

With the constant voltage circuits 80, 85 having the constitution illustrated in FIG. 11 and FIG. 13, since the control circuits 82, 86 are shared in both the 12V channel and 5V channel, there is an advantage in that the circuitry can be simplified and costs can be reduced in comparison to cases of providing control circuits separately to the 12V channel and 5V channel.

Figure 12:
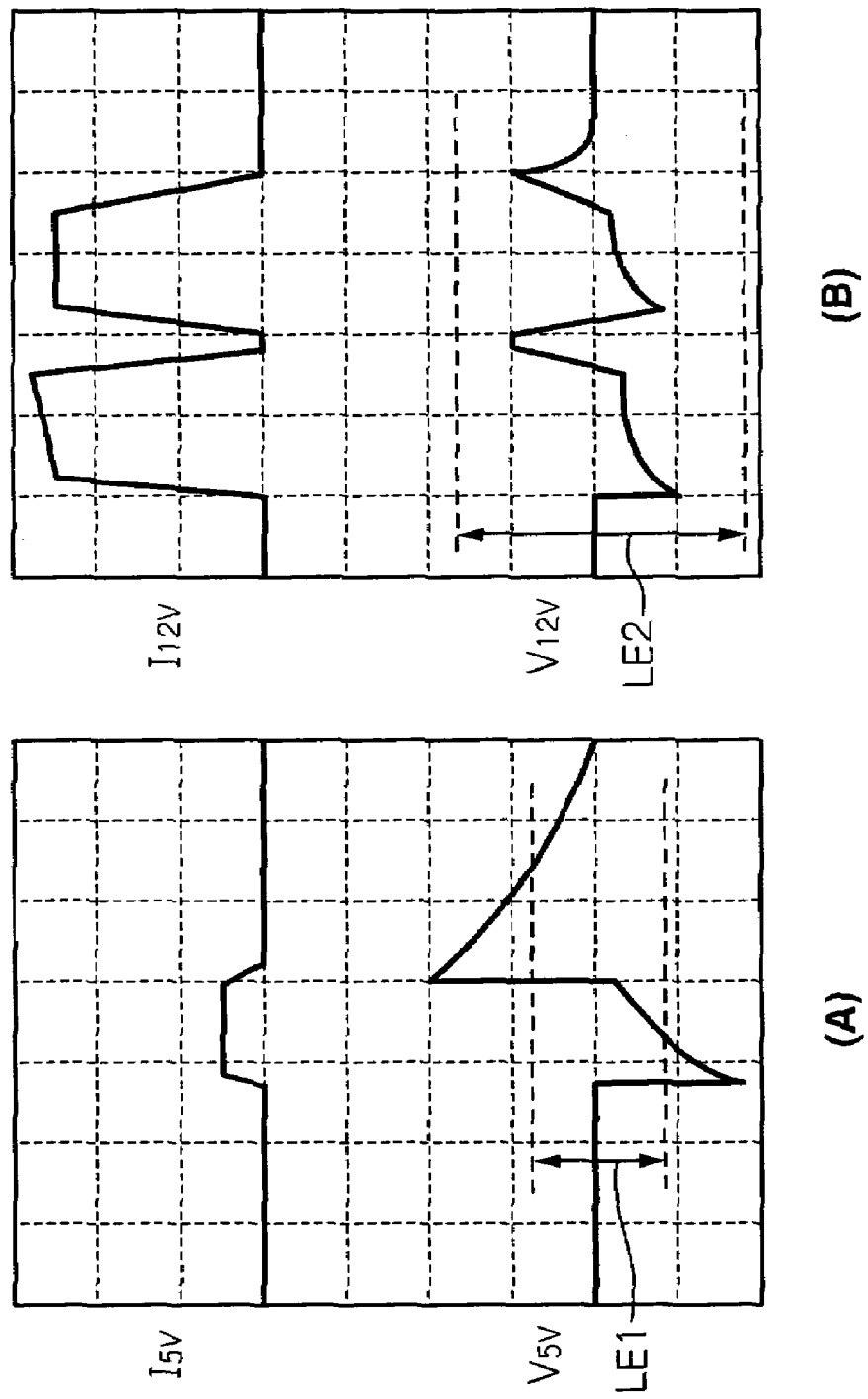
FIG. 12(A) is a waveform diagram explaining the voltage fluctuation of an output voltage in the constant voltage circuit illustrated in FIG. 11.
FIG. 12(B) is a waveform diagram explaining the voltage fluctuation of an output voltage in the constant voltage circuit illustrated in FIG. 11.

Nevertheless, with the foregoing constant voltage circuit 80 described with reference to FIG. 11, for instance, the voltage fluctuation of the 5V channel may become too great as a result of the control circuit 82 performing PWM control to the MOS type FET Q1 of the power converter 80 based on the output of the 12V channel, and, as shown in FIGS. 12(A) and (B), even if the voltage fluctuation of the 12V channel can be kept within the tolerable voltage fluctuation range LE2 (FIG. 12(A)), there may be cases where the voltage fluctuation of the 5V channel will exceed the tolerable voltage fluctuation range LE1 (FIG. 12(B)).

Figure 14:
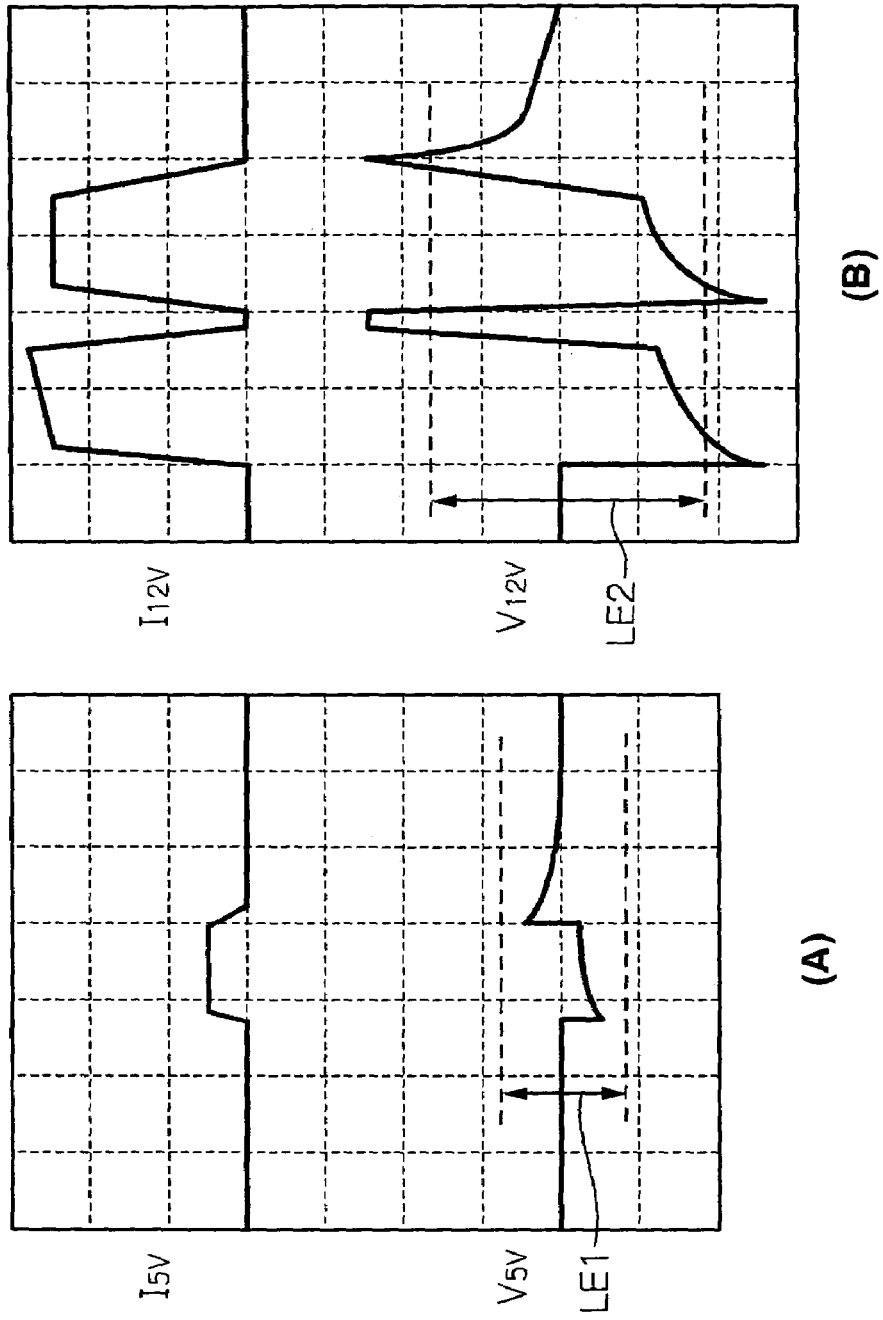
FIG. 14(A) is a waveform diagram explaining the voltage fluctuation of an output voltage in the constant voltage circuit illustrated in FIG. 13.
FIG. 14(B) is a waveform diagram explaining the voltage fluctuation of an output voltage in the constant voltage circuit illustrated in FIG. 13.

Similarly, with the foregoing constant voltage circuit 85 described with reference to FIG. 13, the voltage fluctuation of the 5V channel may become too great as a result of the control circuit 86 performing PWM control to the MOS type FET Q1 of the power converter 80 based on the output of the 5V channel, and, as shown in FIG. 14, even if the voltage fluctuation of the 5V channel can be kept within the tolerable voltage fluctuation range LE1 (FIG. 14(A)), there may be cases where the voltage fluctuation of the 12V channel will exceed the tolerable voltage fluctuation range LE2 (FIG. 14(B)).

Figure 15:
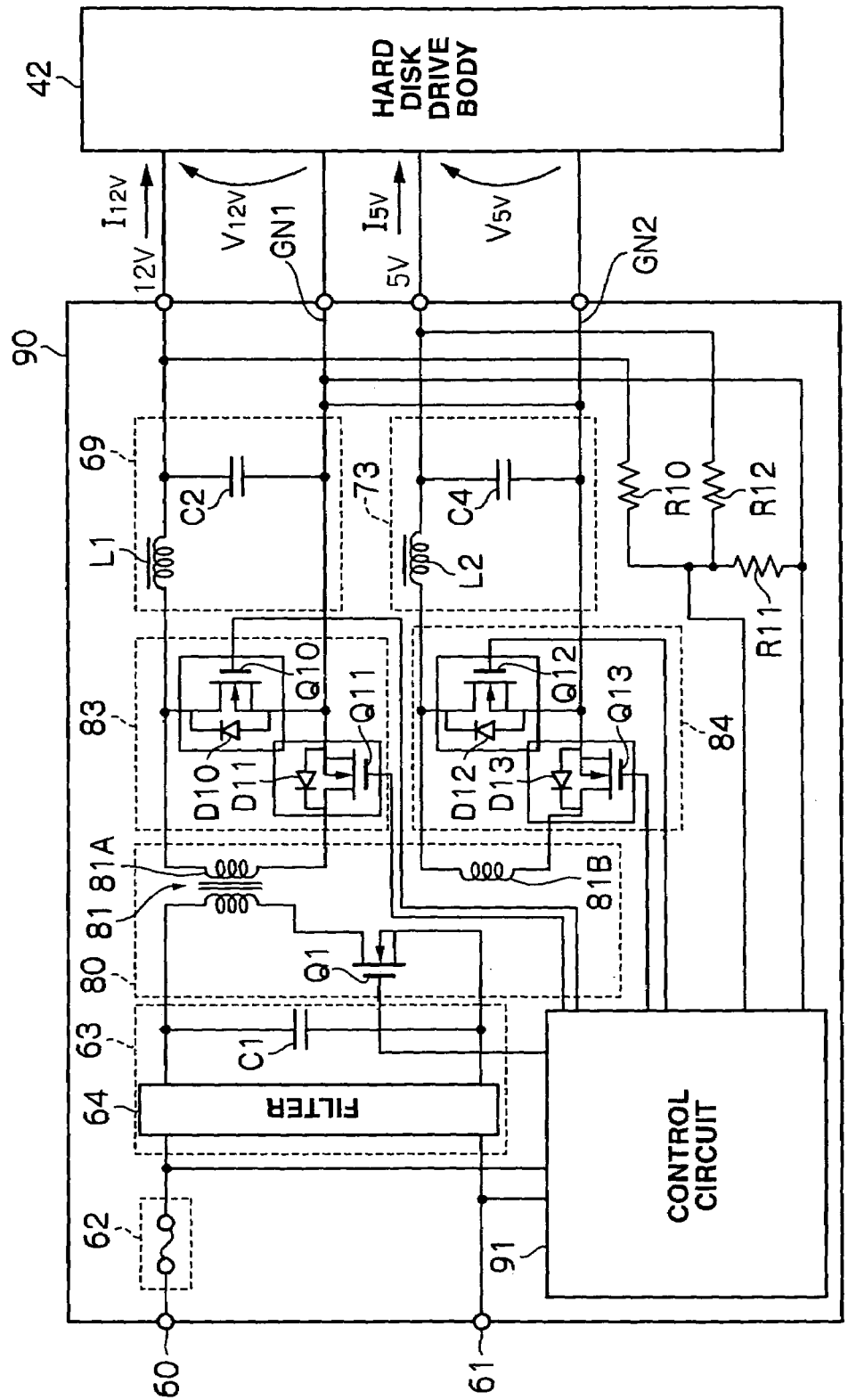
FIG. 15 is a schematic circuit diagram showing a configuration example of a constant voltage circuit of a DC-DC converter.

Thus, as a further improvement plan, as shown in FIG. 15 given the same reference numerals in the components corresponding to those illustrated in FIG. 11, the degree of control of the 12V channel and 5V channel may be adjusted.

In other words, with this constant voltage circuit 90, the 12V line of the 12V channel is connected to the ground line GN2 of the 12V channel via the first and second partial pressure resistances R10, R11, and the 5V line of the 5V channel is connected to the ground line GN2 of the 12V channel via the third and second partial pressure resistances R12, R11, and the connection median of the first and second partial pressure resistances R10, R11 is connected to the control circuit 91. Accordingly, the 12V channel output voltage is applied to the first partial pressure resistance R10, and the 5V channel output voltage is applied to the third partial pressure resistance R12. And, the control circuit 91 performs PWM control to the MOS type FET Q1 of the power converter 80 so that the connection median of the first and second partial pressure resistances R10, R11 will become a prescribed voltage.

With the constant voltage circuit 90 having the foregoing constitution, on the assumption that the generation timing of the transient current in the 12V channel and the generation timing of the transient current in the 5V channel will not overlap, since the degree of control in relation to the 12V channel and the degree of control in relation to the 5V channel will be determined according to the resistance ratio of the first and third partial pressure resistances R10, R12, the voltage control of the 12V channel and 5V channel can be conducted with a single control circuit 91.

Figure 16:
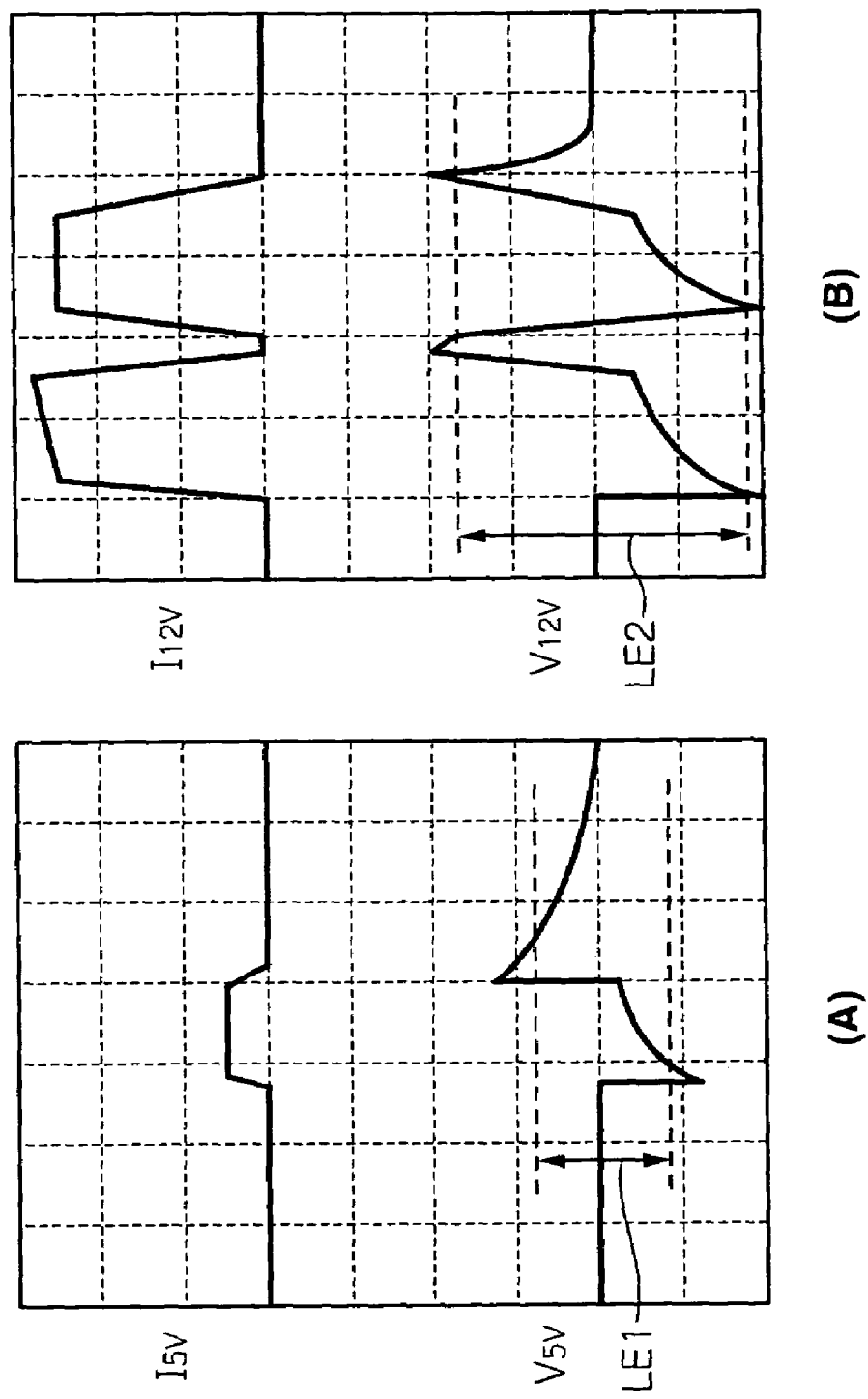
FIG. 16(A) is a waveform diagram explaining the voltage fluctuation of an output voltage in the constant voltage circuit illustrated in FIG. 15.
FIG. 16(B) is a waveform diagram explaining the voltage fluctuation of an output voltage in the constant voltage circuit illustrated in FIG. 15.

Nevertheless, with this constant voltage circuit 90, since the degree of control of the 12V channel and 5V channel is determined based on the resistance setting of the first and third partial pressure resistances R10, R12, it is difficult to set the resistance of the first and third partial pressure resistances R10, R12, and, even though a well-balanced setting is obtained, as shown in FIG. 16, there is a problem in that the voltage fluctuation of the 12V channel (lower section of FIG. 16(A)) and the voltage fluctuation of the 5V channel (lower section of the FIG. 16(B)) will resultingly exceed the tolerable voltage fluctuation ranges LE2, LE1 during the transition period of the voltage, respectively.

Figure 17:
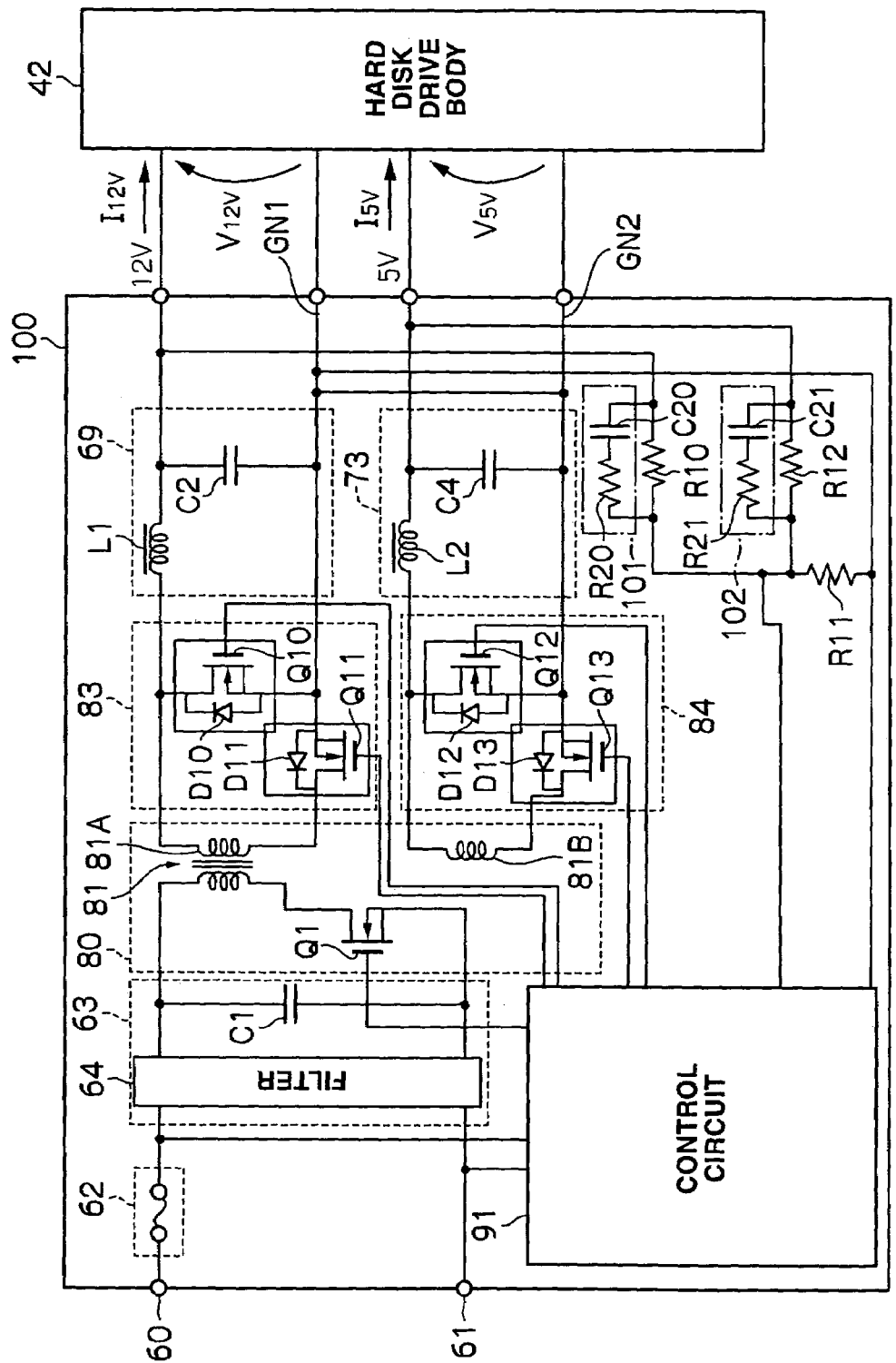
FIG. 17 is a schematic circuit diagram showing the configuration of a constant voltage circuit of a DC-DC converter according to the second embodiment.

Thus, in order to overcome the problem encountered in the second embodiment, as shown in FIG. 17 given the same reference numerals in the components corresponding to those illustrated in FIG. 15, a first phase compensation circuit 101 formed by serially connecting a resistance R20 and a capacitor C20 is connected in parallel to the first partial pressure resistance R1 of the constant voltage circuit 90 described with reference to FIG. 15, and a second phase compensation circuit 102 formed by serially connecting a resistance R21 and a capacitor C21 is connected in parallel to the third partial pressure resistance R12.

In the foregoing case, with the constant voltage circuit 100 according to the second embodiment, resistances that are considerably smaller than the first and third partial pressure resistances R10, R12 are respectively used as the resistances R20, R21 of the first and second phase compensation circuits 101, 102.

Thereby, with this constant voltage circuit 100, while the 12V channel output current flows into the second partial pressure resistance R11 via the first partial pressure resistance R10 during normal operation, when a transient current shown in the upper section of FIG. 17(B) is generated in the 12V channel output current due to the seek operation of the hard disk drive body 42, this transient current will flow into the second partial pressure resistance R11 via the first phase compensation circuit 101 having a smaller resistance between the first partial pressure resistance R10 and first phase compensation circuit 101.

And, when the flow of the transient current is changed as described above, the resistance of the overall feedback loop of the 12V channel (including the resistance in the control circuit 91) will drop according to the difference between the resistance of the first partial pressure resistance R10 and the resistance of the resistance R20 of the first phase compensation circuit 101, and, as a result, the gain of this feedback loop will increase, and the response characteristics will be improved. Further, here, although the 5V channel output current is also flowing to the second partial pressure resistance R12, since the resistance of the resistance R20 of the first phase compensation circuit 101 is considerably smaller in comparison to the resistance of the second partial pressure resistance R12, the 12V channel will be controlled dominantly.

Figure 18:
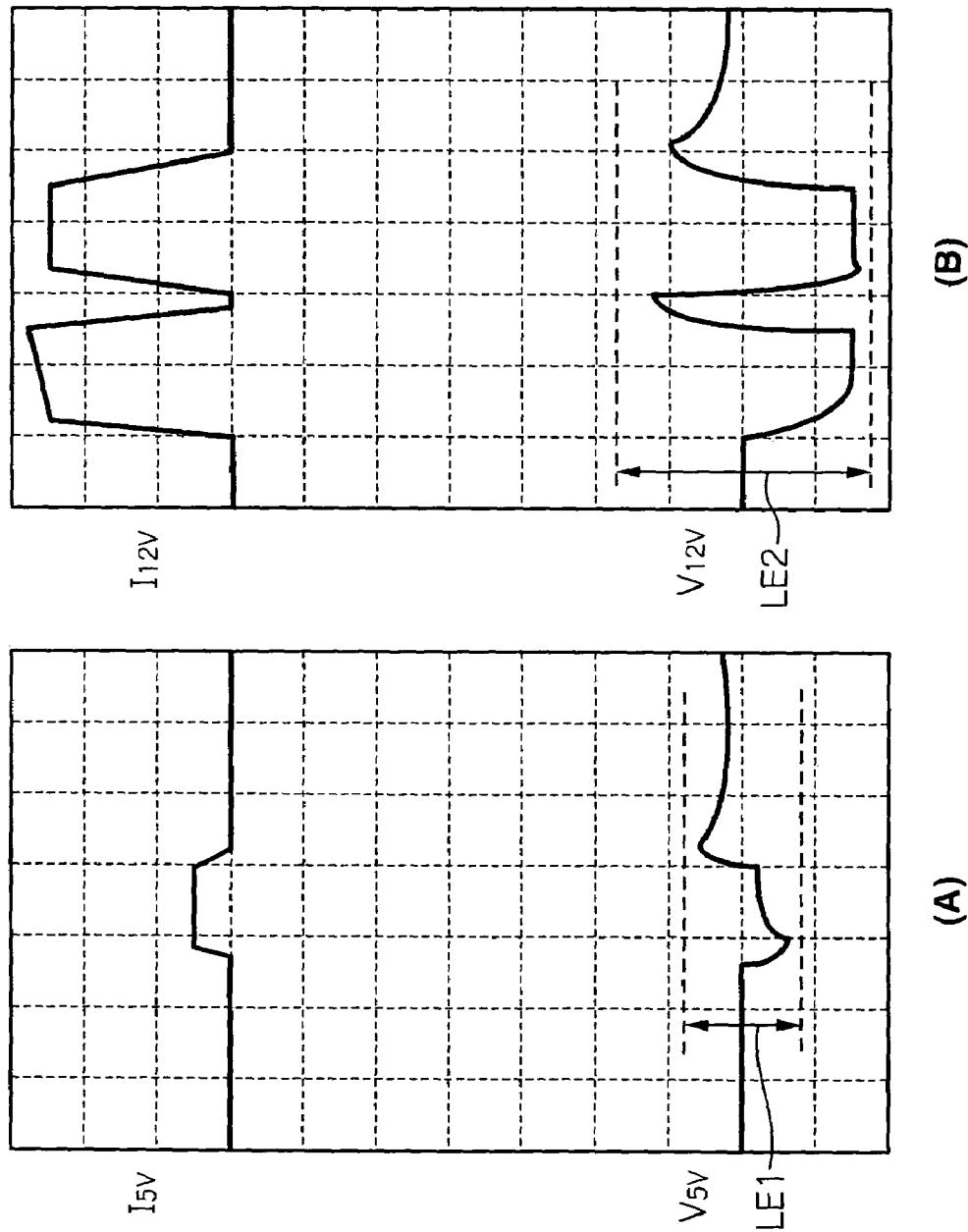
FIG. 18(A) is a waveform diagram explaining the voltage fluctuation of an output voltage in the constant voltage circuit illustrated in FIG. 17.
FIG. 18(B) is a waveform diagram explaining the voltage fluctuation of an output voltage in the constant voltage circuit illustrated in FIG. 17.

Accordingly, for instance, when the first phase compensation circuit 101 does not exist, the overshoot generated during the falling edge or rising edge of the transitional voltage fluctuation as depicted in the lower section of FIG. 18(B) generated pursuant to the fluctuation of the 12V channel output current during the seek depicted in the upper section of FIG. 18(B) can be suppressed by improving the response characteristics of the feedback loop as illustrated in FIG. 18(B), and the fluctuation of the 12V channel output voltage can be suppressed to be within a prescribed tolerable voltage fluctuation range LE2.

Similarly, with this constant voltage circuit 100, while the 5V channel output current flows into the second partial pressure resistance R11 via the third partial pressure resistance R12 during normal operation, when a transient current shown in the upper section of FIG. 18(A) is generated in the 5V channel output current due to the reading and writing of data from and to the hard disk, this transient current will flow into the second partial pressure resistance R11 via the second phase compensation circuit 102 having a smaller resistance between the third partial pressure resistance R12 and second phase compensation circuit 102.

And, when the flow of the transient current is changed as described above, the resistance of the overall feedback loop of the 5V channel (including the resistance in the control circuit 91) will drop according to the difference between the third partial pressure resistance R12 and the resistance R21 of the second phase compensation circuit 102, and, as a result, the gain of this feedback loop will increase, and the response characteristics will be improved. Further, here, although the 12V channel output current is also flowing to the first partial pressure resistance R10, since the resistance of the second phase compensation circuit 102 is considerably smaller in comparison to first partial pressure resistance R10, the 5V channel will be controlled dominantly.

Accordingly, for instance, when the second phase compensation circuit 102 does not exist, the overshoot generated during the falling edge or rising edge of the voltage fluctuation in the 5V channel output voltage as depicted in the lower section of FIG. 18(A) can be suppressed by improving the response characteristics of the feedback loop, and the fluctuation of the 5V channel output voltage can be suppressed to be within a prescribed tolerable voltage fluctuation range LE1.

Figure 19:
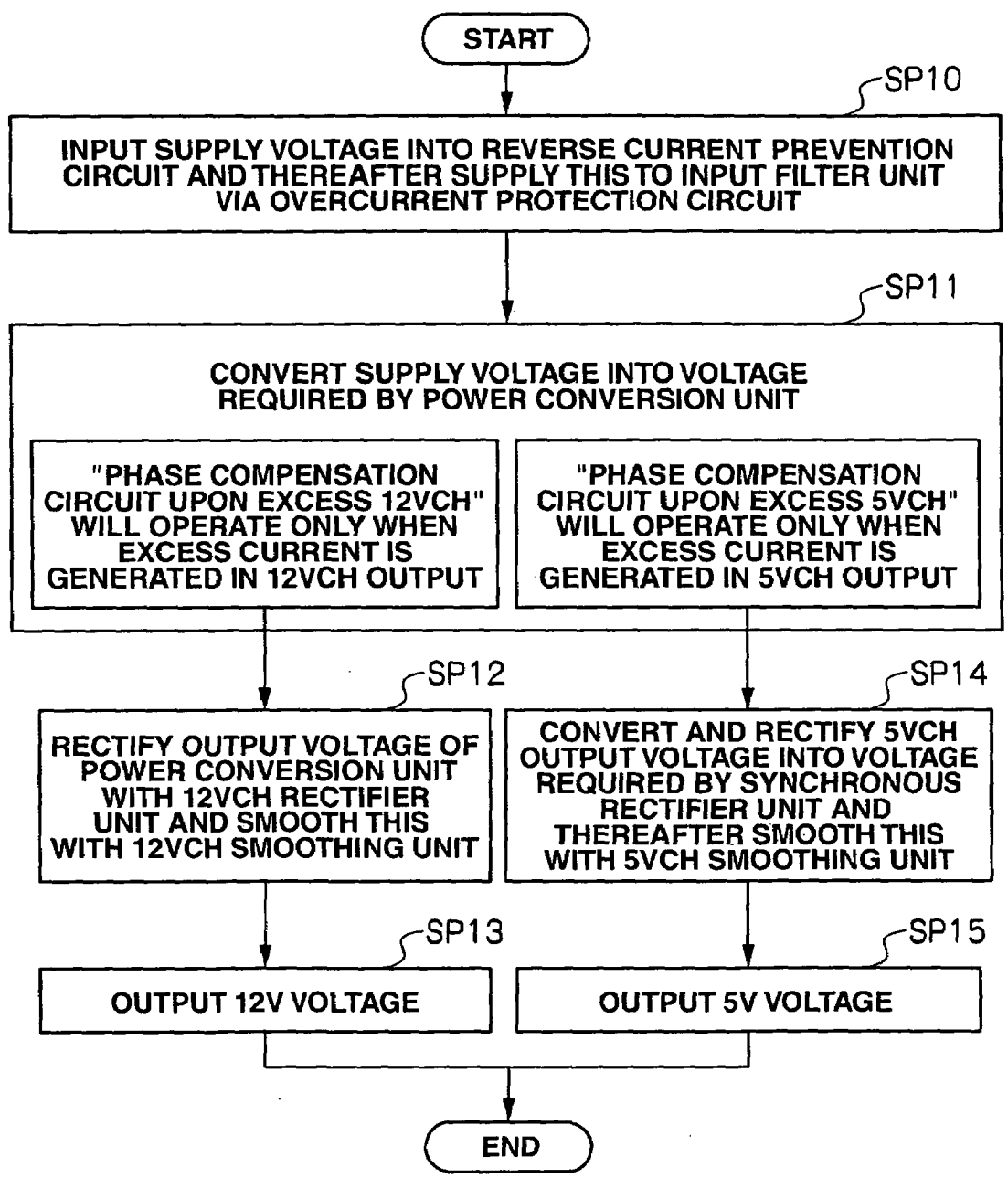
FIG. 19 is a flowchart explaining the operation of the constant voltage circuit illustrated in FIG. 17.

FIG. 19 is a flowchart representing the flow of the series of processing steps until the DC-DC converter 105 (FIG. 7) using this constant voltage circuit 100 outputs the respective 12V and 5V power supply voltages to the hard disk drive body 42. With this DC-DC converter 105, the 12 to 48V supply voltages supplied via the first or second common power supply path 51, 53 are input to the input filter unit 63 sequentially via the reverse current prevention circuit 53 and the excess current protection circuit 62 in the constant voltage circuit 100 so as to further stabilize the filtering processing in this input filter unit 63 (SP10).

And, with the DC-DC converter 105, this stabilized supply voltage is DC-DC converted into the required power supply voltage by performing PWM control to the MOS type FET Q1 of the power converter 80 (SP11). Here, in the 12V channel, the first phase compensation circuit 101 provided in parallel to the first partial pressure resistance R10 in the feedback loop is only operated when a transient current is generated in the 12V channel, and, by preferentially performing stabilizing control to the 12V channel, the fluctuation of the 12V channel output voltage can be suppressed to be within the prescribed tolerable voltage fluctuation range LE2 (SP11).

Further, in the DC-DC converter 105, the DC-DC converted voltage is thereafter rectified in the 12V channel rectifier 83, smoothed in the 12V channel smoother 69 (SP12), and then output to the hard disk drive body 42 (SP13).

Moreover, here, in the 5V channel, the second phase compensation circuit 102 provided in parallel to the third partial pressure resistance R12 in the feedback loop is only operated when a transient current is generated in the 5V channel, and, by preferentially performing stabilizing control to the 5V channel, the fluctuation of the 5V channel output voltage can be suppressed to be within the prescribed tolerable voltage fluctuation range LE1 (SP11).

Further, in the DC-DC converter 105, the DC-DC converted voltage is thereafter rectified in the 5V channel rectifier 84, smoothed in the 5V channel smoother 73 (SP14), and then output to the hard disk drive body 42 (SP15).

Thereby, with the DC-DC converter 105 using this constant voltage circuit 100, since the transitional voltage fluctuation generated in the 12V channel output voltage and the transitional voltage fluctuation generated in the 5V channel output voltage can both be suppressed with a single control circuit 91, in comparison to the DC-DC converter 41 according to the first embodiment, the DC-DC converter can be constituted with a simpler circuitry and inexpensively.

(3) Third Embodiment

Figure 20:
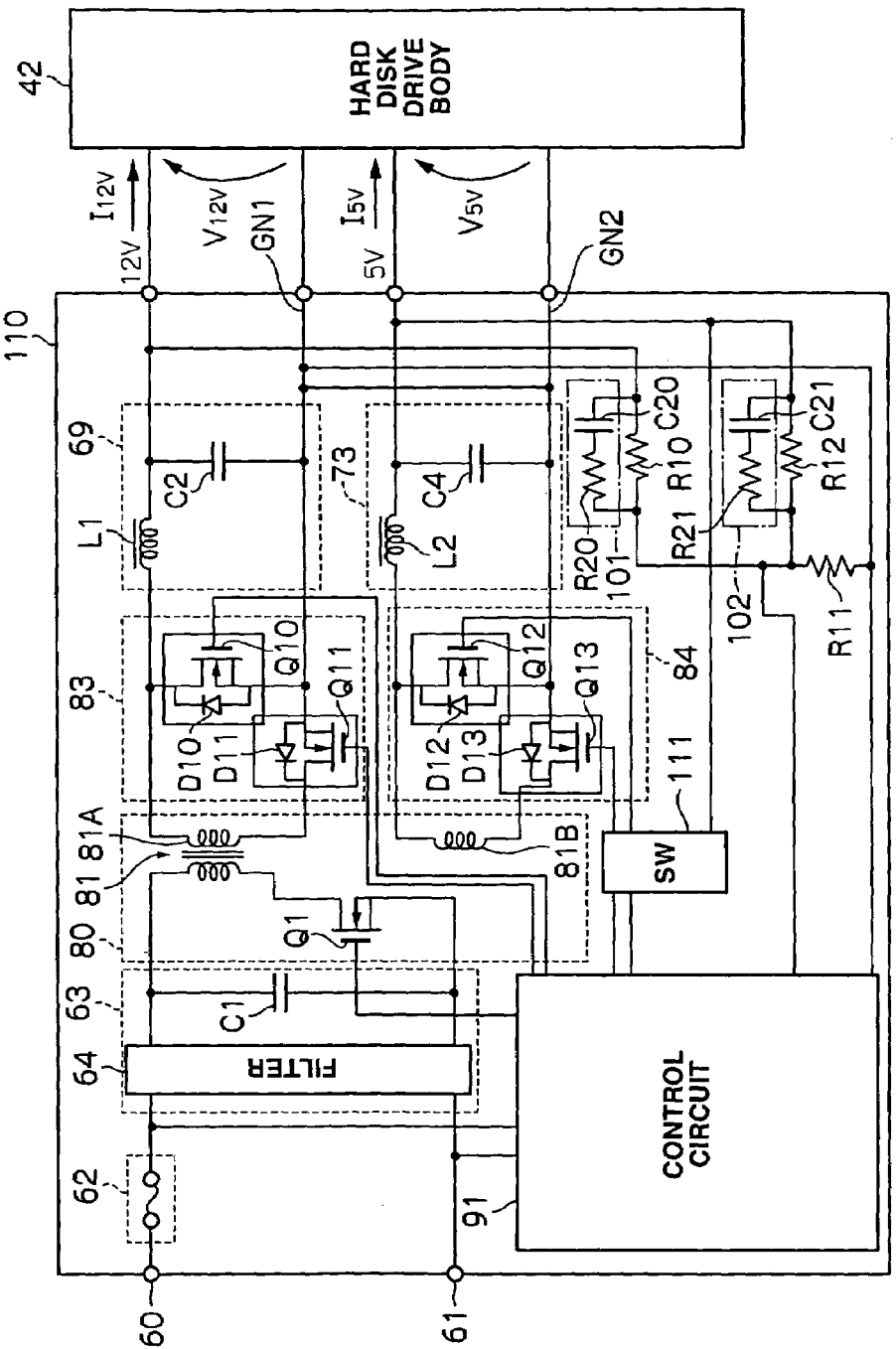
FIG. 20 is a schematic circuit diagram showing a configuration of a constant voltage circuit of a DC-DC converter according to the third embodiment.

FIG. 20 given the same reference numerals in the components corresponding to those illustrated in FIG. 17 shows a constant voltage circuit 110 according to the third embodiment. With this constant voltage circuit 110, a switch circuit 111 is inserted on the control line of the control circuit 91 in relation to the first and second MOS type FETs Q12, Q13 of the 5V channel rectifier 84.

The first PWM signal output from the control circuit 91 to be applied to the gate of the first MOS type FET Q12 of the 5V channel rectifier 84 is not passed through this switch circuit 11 during normal operations, and only the second PWM signal output from the control circuit 91 to be applied to the gate of the second MOS type FET Q13 of the 5V channel rectifier 84 is passed therethrough. Accordingly, with the 5V channel rectifier 84, during normal operations, the output voltage output from the 5V channel secondary side coil 81B of the transformer 81 of the power converter 83 is rectified via the switching of the second MOS type FET Q13.

Meanwhile, this switch circuit 111 is connected to the 5V line of the 5V channel, and the output voltage of such 5V channel is supplied thereto. And, the switch circuit 111 constantly monitors the degree of fluctuation of the output voltage based on the 5V channel output voltage, and, for instance, when the 5V channel output voltage drops in a degree beyond the prescribed first threshold value such as by a transient current shown in the uppermost section of FIG. 21(A) being generated in the 5V channel output current (c.f. falling edge of waveform in the fourth row of FIG. 21(A)), as shown in the second row of FIG. 21(A), it applies the first PWM signal from the control circuit 91 to the gate of the first MOS type FET Q12 of the 5V channel rectifier 84 until the 5V channel output voltage become 5V or greater.

Figure 21:
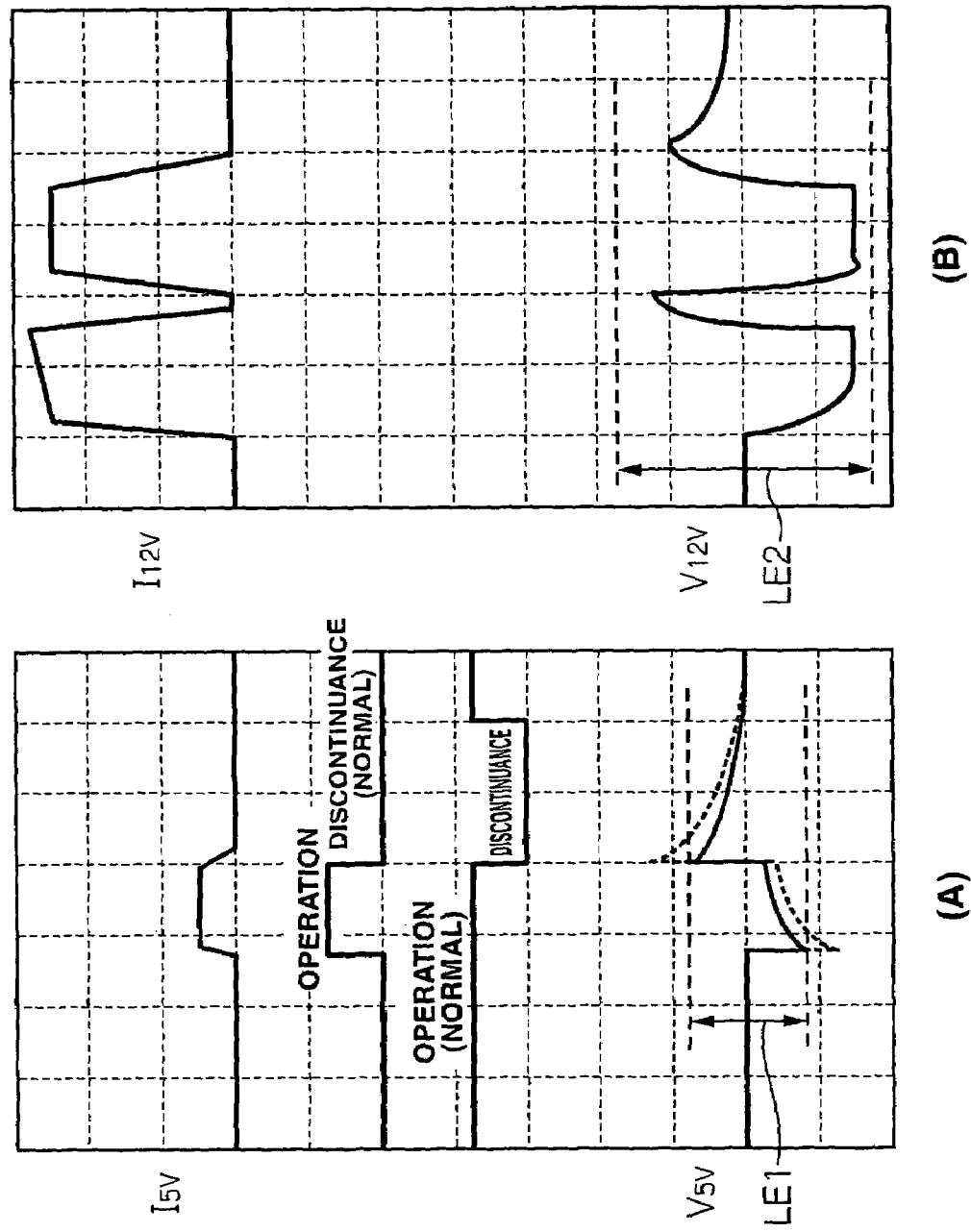
FIG. 21(A) is a waveform diagram explaining the voltage fluctuation of an output voltage in the constant voltage circuit illustrated in FIG. 20.
FIG. 21(B) is a waveform diagram explaining the voltage fluctuation of an output voltage in the constant voltage circuit illustrated in FIG. 20.

Further, when the 5V channel output voltage rises in a degree beyond the prescribed second threshold value (c.f. rising edge of waveform in the fourth row of FIG. 21(A)), the switch circuit 111, as shown in the third row of FIG. 21(A), stops applying the second PWM signal from the control circuit 91 to the gate of the second MOS type FET Q13 of the 5V channel rectifier 84 until the 5V channel output voltage falls below 5V.

And, when this kind of control is conducted in the switch circuit 111, in the 5V channel rectifier 84, since the operation of the first MOS type FET Q12 is discontinued during normal operation, a voltage drop of roughly 0.6V will occur to the flowing current due to the parasitic diode D12 of the first MOS type FET Q12, and, when the first MOS type FET Q12 is operated, such voltage drop value will become roughly 0.3 to 0.4V as the dynamic resistance of the first MOS type FET Q12. Thus, here, as shown in the fourth row of FIG. 21(A), in comparison to the 5V channel output voltage (dashed line) in a case of doing nothing, as a result of the actual 5V channel output voltage (solid line) rising in an amount of the difference between the voltage drop value in a case of not operating the first MOS type FET Q12 and the voltage drop value in a case of operating the first MOS type FET Q12, the amount of voltage fluctuation can be reduced.

Further, with the 5V channel rectifier 84, since the second MOS type FET Q13 is operating during normal operation, a voltage drop of roughly 0.3 to 0.4V will occur to the flowing current due to the second MOS type FET Q13, and, when the second MOS type FET Q12 is discontinued, such voltage drop value will become roughly 0.6V as the resistance of the parasitic diode of the second MOS type FET Q13. Thus, here, as shown in the fourth row of FIG. 21(A), in comparison to the 5V channel output voltage (dashed line) in a case of doing nothing, as a result of the actual 5V channel output voltage (solid line) rising in an amount of the difference between the voltage drop value in a case of not operating the second MOS type FET Q13 and the voltage drop value in a case of operating the second MOS type FET Q13, the amount of voltage fluctuation can be reduced.

Figure 22:
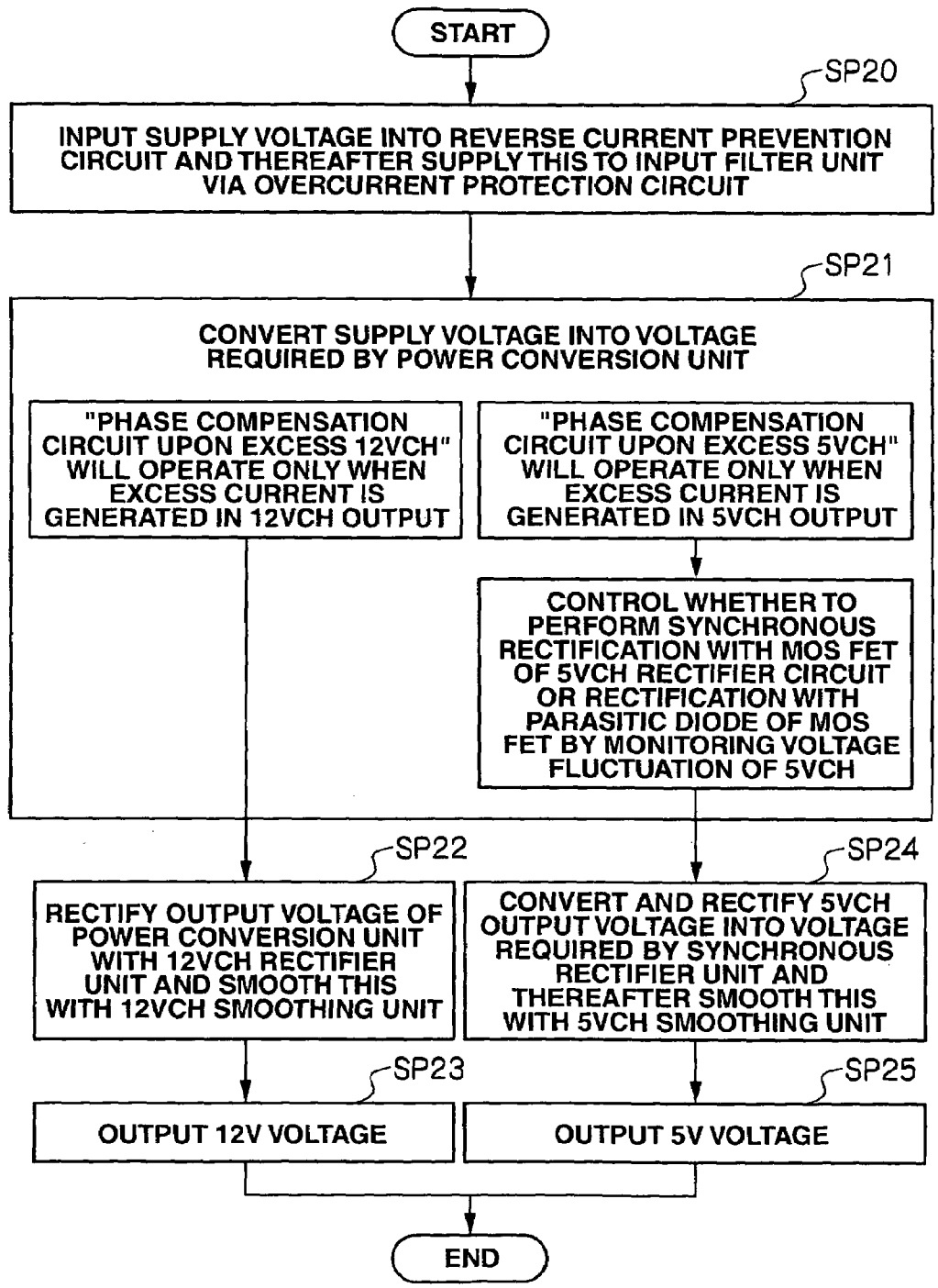
FIG. 22 is a flowchart explaining the operation of the constant voltage circuit illustrated in FIG. 20.

FIG. 22 is a flowchart representing the flow of the series of processing steps until the DC-DC converter 112 (FIG. 7) using this constant voltage circuit 110 outputs the respective 12V and 5V power supply voltages to the hard disk drive body 42. With this DC-DC converter 112, the 12 to 48V supply voltages supplied via the first or second common power supply path 51, 53 are input to the input filter unit 63 sequentially via the reverse current prevention circuit 53 and the excess current protection circuit 62 in the constant voltage circuit 100 so as to further stabilize the filtering processing in this input filter unit 63 (SP20).

And, with the DC-DC converter 112, this stabilized supply voltage is DC-DC converted into the required power supply voltage by performing PWM control to the MOS type FET Q1 of the power converter 80 (SP21). Here, in the 12V channel, the first phase compensation circuit 101 provided in parallel to the first partial pressure resistance R10 in the feedback loop is only operated when a transient current is generated in the 12V channel, and, by preferentially performing stabilizing control to the 12V channel, the fluctuation of the 12V channel output voltage can be suppressed to be within the prescribed tolerable voltage fluctuation range LE2 (SP22).

Further, in the DC-DC converter 112, the DC-DC converted voltage is thereafter rectified in the 12V channel rectifier 83, smoothed in the 12V channel smoother 69 (SP22), and then output to the hard disk drive body 42 (SP23).

Moreover, here, in the 5V channel, the second phase compensation circuit 102 provided in parallel to the third partial pressure resistance R12 in the feedback loop is only operated when a transient current is generated in the 5V channel, and, by preferentially performing stabilizing control to the 5V channel, the fluctuation of the 5V channel output voltage can be suppressed to be within the prescribed tolerable voltage fluctuation range LE1 (SP21). In addition, the switch circuit 111 constantly monitors the 5V channel output voltage, and further seeks stabilization by operating the first or second MOS type FET Q12, Q13 of the 5V channel rectifier 84 so as to rectify the voltage, or using the parasitic diodes D12, D13 of the first or second MOS type FET Q12, Q13 (SP21).

Further still, in the DC-DC converter 112, the DC-DC converted voltage is thereafter rectified in the 5V channel rectifier 84, smoothed in the 5V channel smoother 73 (SP24), and then output to the hard disk drive body 42 (SP25).

Thereby, with the DC-DC converter 112 using this constant voltage circuit 110, since the 5V channel output voltage is constantly monitored to control whether to operate the first or second MOS type FET of the 5V channel rectifier 84 to rectify such voltage or use the parasitic diodes of the first or second MOS type FET to rectify such voltage, in comparison to the DC-DC converter 105 using the constant voltage circuit 100 according to the second embodiment, the 5V channel can be further stabilized.

Thus, according to this DC-DC converter 112, in addition to the effect obtained with the DC-DC converter 105 according to the second embodiment, the voltage fluctuation which causes malfunctions in the hard disk drive body 42 (hard disk drive 23) can be efficiently reduced even further.

(4) Other Embodiments

Incidentally, in the foregoing second and third embodiments, although a case was explained where a phase compensation circuit 101, 102 (FIG. 17) was provided to both the 5V channel and 12V channel, the present invention is not limited thereto, and a phase compensation circuit may only be provided to either the 5V channel or 12V channel. Thereby, the transitional fluctuation of the output voltage regarding at least the 5V channel or 12V channel provided with such phase compensation circuit can be effectively suppressed.

Further, in the foregoing first to third embodiments, although a case was explained where the voltage converter for converting the 12 to 48V direct voltage (first direct voltage) supplied from the first and second power supply systems 50A, 50B via the first or second common power supply path 51A, 51B into a 12V or 5V direct voltage (second direct voltage) was configured from the excess current protection circuit 62, input filter unit 63, power converters 65, 80, 12V channel rectifiers 68, 83, 12V channel smoother 69, 5V channel rectifiers 71, 84 and 5V channel smoother 73 as illustrated in FIG. 8, FIG. 17 and FIG. 20, the present invention is not limited thereto, and the voltage converter may be configured based on a wide variety of other configurations.

Moreover, in the foregoing first to third embodiments, although a case was explained where the response characteristics switching unit for switching the response characteristics of the control unit (12V channel control circuit 67 (FIG. 8), 5V channel control circuit 72 (FIG. 8), control circuits 82, 91 (FIG. 11, FIG. 15)) when a transitional voltage fluctuation is generated in the output voltage of the 12V channel or 5V channel was configured from the phase compensation circuits 70, 74, 101, 102 and resistances R1, R3, R10, R12 (FIG. 8, FIG. 17) as illustrated in FIG. 8 and FIG. 17, the present invention is not limited thereto, and may be configured based on a wide variety of other configurations.

The present invention may be widely employed in various types of disk array devices.

We claim:

1. A disk array device having a plurality of hard disk drives for respectively storing data, and which converts a first direct voltage supplied to each of said hard disk drives via a common power supply bus into a second direct voltage required by said hard disk drives at each of said hard disk drives, wherein each of said hard disk drives comprises:

a voltage converter for converting said first direct voltage into said second direct voltage;

a control unit for controlling said voltage converter so as to suppress the fluctuation of said second direct voltage based on said second direct voltage output from said voltage converter; and a response characteristics switching unit for switching the response characteristics of said control unit against the fluctuation of said second direct voltage so as to improve said response characteristics of said control unit against the fluctuation of said second direct voltage when a transitional voltage fluctuation of said second direct voltage occurs;

wherein said voltage converter converts said first direct voltage into a plurality of types of mutually differing second direct voltages, and wherein said control circuit includes an adjustment unit for adjusting the degree of controlling each of said second direct voltages, and said control unit controls said voltage converter so as to suppress the fluctuation of each of said second direct voltages based on the degree of control adjusted with said adjustment unit.

2. The disk array device according to claim 1, wherein said response characteristics switching unit comprises:

a first resistance provided to a front end of said control unit in a feedback loop between said voltage converter and control unit; and a phase compensation circuit connected in parallel with said first resistance and which serially connects a second resistance and a capacitor.

3. The disk array device according to claim 1, wherein said response characteristics switching unit is provided to said adjustment unit in correspondence with at least one among each of said second direct voltages.

4. The disk array device according to claim 1, further comprising:
a rectifier unit formed with a transistor and for rectifying said second direct voltage; and
a switching unit for switching the operating state of said transistor so as to operate or stop said transistor of said rectifier unit;
wherein said switching unit monitors the fluctuation of at least one of said second direct voltages among each of said second direct voltages and, when the transitional fluctuation of said second direct voltage is detected, switches the operating state of said transistor so as to control the fluctuation of said second direct voltage by utilizing the difference between a voltage drop by said transistor in an ON state and a voltage drop by a parasitic diode of said transistor during an OFF state.

5. A disk array device having a plurality of hard disk drives for respectively storing data, and which converts a first direct voltage supplied to each of said hard disk drives via a common power supply bus into a plurality of second direct voltages required by said hard disk drives at each of said hard disk drives,
wherein each of said hard disk drives comprises:
a voltage converter for converting said first direct voltage into said plurality of said second direct voltages;
a control unit for controlling said voltage converter so as to suppress the fluctuation of said second direct voltages based on said second direct voltages output from said voltage converter; and
a response characteristics switching unit for switching the response characteristics of said control unit against the fluctuation of said second direct voltages so as to improve said response characteristics of said control unit against the fluctuation of said second direct voltages when a transitional voltage fluctuation of said second direct voltages occurs;
wherein said adjustment unit comprises:
a plurality of first partial pressure resistances, each of said first partial pressure resistances having a first and second terminal thereof, wherein said plurality of first partial pressure resistances are, respectively provided in correspondence with each of said second direct voltages, and to which a corresponding second direct voltage of said second direct voltages is respectively applied to said second terminal of each of said first partial pressure resistances;
and a second partial pressure resistance, having a first and second terminal thereof, wherein the first terminal of said second partial pressure resistance is connected to the first terminal of each of said first partial pressure resistances, and the second terminal of said second partial pressure resistance is connected to a ground connection;
and said control unit controls said voltage converter such that the connection between the first terminal of each of said first partial pressure resistances and the first terminal of said second partial pressure resistance becomes a prescribed voltage.

6. The disk array device according to claim 5, wherein said response characteristics switching unit comprises:
a first resistance provided to a front end of said control unit in a feedback loop between said voltage converter and control unit; and
a phase compensation circuit connected in parallel with said first resistance and which serially connects a second resistance and a capacitor.

7. The disk array device according to claim 5, wherein said response characteristics switching unit is provided to said adjustment unit in correspondence with at least one among each of said second direct voltages.

8. The disk array device according to claim 3, further comprising:
a rectifier unit formed with a transistor and for rectifying said second direct voltage; and
a switching unit for switching the operating state of said transistor so as to operate or stop said transistor of said rectifier unit;
wherein said switching unit monitors the fluctuation of at least one of said second direct voltages among each of said second direct voltages and, when the transitional fluctuation of said second direct voltage is detected, switches the operating state of said transistor so as to control the fluctuation of said second direct voltage by utilizing the difference between a voltage drop by said transistor in an ON state and a voltage drop by a parasitic diode of said transistor during an OFF state.

* * * * *